US012633978B2

(12) United States Patent
Rezk et al.

(10) Patent No.: US 12,633,978 B2
(45) Date of Patent: May 19, 2026

(54) COORDINATION FOR SMOOTH BEAMFORMING

(71) Applicant: QUALCOMM Incorporated, San Diego, CA (US)

(72) Inventors: Meriam Rezk, Campbell, CA (US); Cheng-Ming Chen, Hsinchu (TW); Deniz Rende, San Jose, CA (US); Ahmed Ragab Elsherif, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 18/633,088

(22) Filed: Apr. 11, 2024

(65) Prior Publication Data

US 2025/0323696 A1    Oct. 16, 2025

(51) Int. Cl.
*H04B 7/06* (2006.01)
*H04B 7/08* (2006.01)
*H04L 25/02* (2006.01)

(52) U.S. Cl.
CPC ......... *H04B 7/0617* (2013.01); *H04B 7/0634* (2013.01); *H04B 7/086* (2013.01); *H04L 25/0204* (2013.01)

(58) Field of Classification Search
CPC .................................................. H04B 7/0617
USPC ......................................................... 375/262
See application file for complete search history.

(56) References Cited

U.S. PATENT DOCUMENTS

| 10,454,719 | B1 * | 10/2019 | Rottela | H04B 17/336 |
| 2003/0058962 | A1 * | 3/2003 | Baldwin | H04L 1/20 375/316 |
| 2014/0072066 | A1 * | 3/2014 | Lindoff | H04B 7/0608 375/267 |
| 2014/0328335 | A1 * | 11/2014 | Zhang | H04B 7/0695 370/338 |
| 2017/0085396 | A1 | 3/2017 | Hu et al. | |
| 2017/0331534 | A1 | 11/2017 | Jiang et al. | |
| 2021/0044511 | A1 * | 2/2021 | Connolly | H04L 43/50 |

(Continued)

OTHER PUBLICATIONS

International Search Report and Written Opinion—PCT/US2025/014646—ISA/EPO—Jun. 11, 2025.

*Primary Examiner* — Lihong Yu
(74) *Attorney, Agent, or Firm* — Holland & Hart LLP

(57) ABSTRACT

This disclosure provides methods, components, devices and systems for coordination for smooth beamforming. Some aspects more specifically relate to techniques to reduce phase misalignment and delay spread to beamformed messages such that a receiving device may apply channel smoothing filtering to the received beamformed message. In some examples, the transmitting device may ensure that the delay spread of the steered channel for a beamformed message is roughly matching the delay spread of an open-loop channel. The transmitting device may signal for the receiving device to perform channel smoothing filtering to a received beamformed message, for example, because the transmitting device applies techniques to reduce the phase misalignment and delay spread to the beamformed message. In some examples, based on the indication, the receiving device may apply channel smoothing filtering to a beamformed transmission received from the transmitting device.

19 Claims, 8 Drawing Sheets

(56) References Cited

U.S. PATENT DOCUMENTS

| 2022/0345904 | A1* | 10/2022 | Jeon | ..................... | H04B 7/0617 |
| 2023/0300649 | A1* | 9/2023 | Mei | ..................... | H04L 25/0212 |
| | | | | | 370/252 |

* cited by examiner

Communicate, with a second wireless communication device, control signaling that indicates that the first wireless communication device is scheduled to transmit a beamformed message to the second wireless communication device, and where the control signaling includes an indication that the second wireless communication device is to apply channel smoothing filtering to the beamformed message

705

Transmit, to the second wireless communication device and in association with the control signaling, the beamformed message via a set of frequency tones, where one or both of the beamformed message satisfies a delay spread threshold or a phase alignment of the beamformed message associated with the set of frequency tones satisfies a phase alignment threshold

710

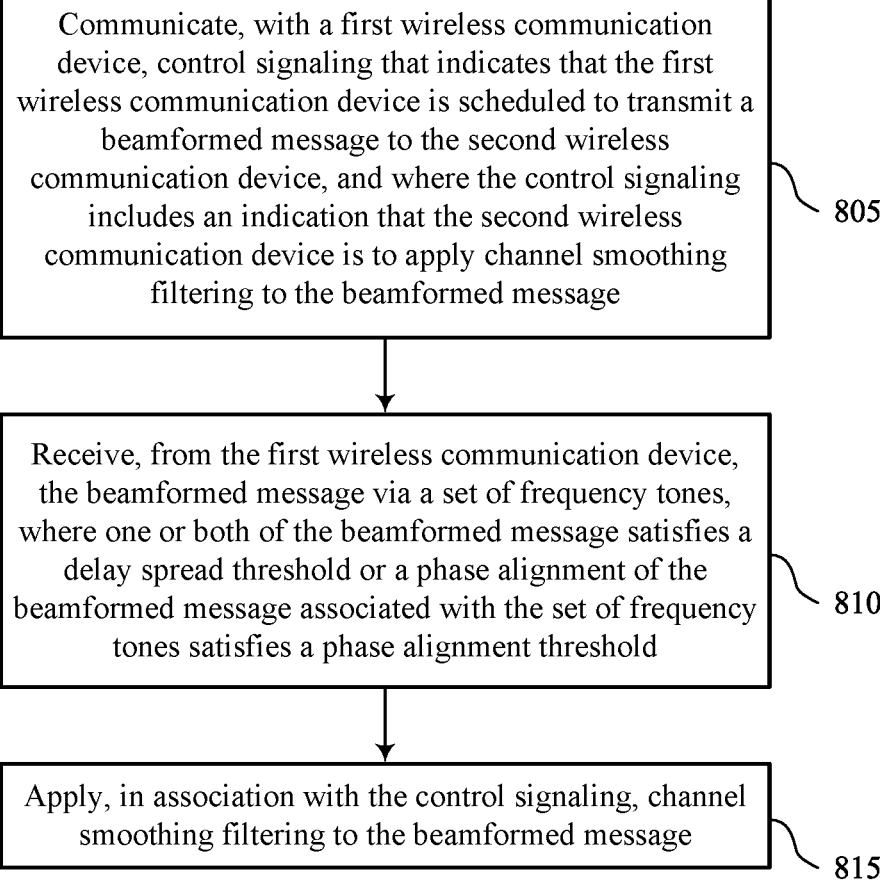

Communicate, with a first wireless communication device, control signaling that indicates that the first wireless communication device is scheduled to transmit a beamformed message to the second wireless communication device, and where the control signaling includes an indication that the second wireless communication device is to apply channel smoothing filtering to the beamformed message

805

Receive, from the first wireless communication device, the beamformed message via a set of frequency tones, where one or both of the beamformed message satisfies a delay spread threshold or a phase alignment of the beamformed message associated with the set of frequency tones satisfies a phase alignment threshold

810

Apply, in association with the control signaling, channel smoothing filtering to the beamformed message

COORDINATION FOR SMOOTH BEAMFORMING

TECHNICAL FIELD

This disclosure relates generally to wireless communication and, more specifically, to coordination for smooth beamforming.

DESCRIPTION OF THE RELATED TECHNOLOGY

Wireless communication networks are widely deployed to provide various types of communication content such as voice, video, packet data, messaging, broadcast, and so on. Some wireless communication networks may be capable of supporting communication with multiple users by sharing the available system resources (such as time, frequency, or power). Further, a wireless communication network may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM), among other examples. Wireless communication devices may communicate in accordance with any one or more of such wireless communication technologies, and may include wireless stations (STAs), wireless access points (APs), user equipment (UEs), network entities, or other wireless nodes.

Some WLANs may support beamforming of communications between devices (such as downlink communications from an AP to a STA or uplink communications from a STA to an AP) to improve performance as compared to communication over multipath channels. A transmitting device may use singular value decomposition (SVD) techniques to generate beamformed transmissions. A receiving device may use channel smoothing, also referred to as noise filtering, to reduce channel estimation error by exploiting the correlation across the frequency-domain responses. SVD, however, may introduce phase misalignments across tones in the frequency domain, which may create a large delay profile for the channel in which the beamformed transmission is transmitted. Applying channel smoothing to a channel with a large delay profile may cut out part of the channel, thereby introducing error or potential packet loss.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communications by a first wireless communication device. The method may include communicating, with a second wireless communication device, control signaling that indicates that the first wireless communication device is scheduled to transmit a beamformed message to the second wireless communication device, and where the control signaling includes an indication that the second wireless communication device is to apply channel smoothing filtering to the beamformed message and transmitting, to the second wireless communication device and in association with the control signaling, the beamformed message via a set of frequency tones, where one or both of the beamformed message satisfies a delay spread threshold or a phase alignment of the beamformed message associated with the set of frequency tones satisfies a phase alignment threshold.

Another innovative aspect of the subject matter described in this disclosure can be implemented in a first wireless communication device for wireless communications. The first wireless communication device may include a processing system that includes processor circuitry and memory circuitry that stores code. The processing system may be configured to cause the first wireless communication device to communicate, with a second wireless communication device, control signaling that indicates that the first wireless communication device is scheduled to transmit a beamformed message to the second wireless communication device, and where the control signaling includes an indication that the second wireless communication device is to apply channel smoothing filtering to the beamformed message and transmit, to the second wireless communication device and in association with the control signaling, the beamformed message via a set of frequency tones, where one or both of the beamformed message satisfies a delay spread threshold or a phase alignment of the beamformed message associated with the set of frequency tones satisfies a phase alignment threshold.

Another innovative aspect of the subject matter described in this disclosure can be implemented in another first wireless communication device for wireless communications. The first wireless communication device may include means for communicating, with a second wireless communication device, control signaling that indicates that the first wireless communication device is scheduled to transmit a beamformed message to the second wireless communication device, and where the control signaling includes an indication that the second wireless communication device is to apply channel smoothing filtering to the beamformed message and means for transmitting, to the second wireless communication device and in association with the control signaling, the beamformed message via a set of frequency tones, where one or both of the beamformed message satisfies a delay spread threshold or a phase alignment of the beamformed message associated with the set of frequency tones satisfies a phase alignment threshold.

Another innovative aspect of the subject matter described in this disclosure can be implemented in a non-transitory computer-readable medium storing code for wireless communications. The code may include instructions executable by one or more processors to communicate, with a second wireless communication device, control signaling that indicates that the first wireless communication device is scheduled to transmit a beamformed message to the second wireless communication device, and where the control signaling includes an indication that the second wireless communication device is to apply channel smoothing filtering to the beamformed message and transmit, to the second wireless communication device and in association with the control signaling, the beamformed message via a set of frequency tones, where one or both of the beamformed message satisfies a delay spread threshold or a phase alignment of the beamformed message associated with the set of frequency tones satisfies a phase alignment threshold.

In some examples of the method, first wireless communication devices, and non-transitory computer-readable medium described herein, communicating the control signaling may include operations, features, means, or instructions for transmitting a control message that includes a first field that indicates that the first wireless communication device may be scheduled to transmit the beamformed message, where the control message includes a second field that includes the indication that the second wireless communication device may be to apply channel smoothing filtering to the beamformed message.

In some examples of the method, first wireless communication devices, and non-transitory computer-readable medium described herein, the control signaling includes an indication of a device type of the first wireless communication device, the indication of the device type indicates that the first wireless communication device may be scheduled to transmit the beamformed message, and the indication of the device type may be the indication that the second wireless communication device may be to apply channel smoothing filtering to the beamformed message.

In some examples of the method, first wireless communication devices, and non-transitory computer-readable medium described herein, communicating the control signaling may include operations, features, means, or instructions for transmitting a first control message that indicates that the first wireless communication device may be scheduled to transmit the beamformed message to the second wireless communication device, receiving a second control message that indicates a feedback type and receiver type of the second wireless communication device, and transmitting, in response to the second control message, a third control message that includes the indication that the second wireless communication device may be to apply channel smoothing filtering to the beamformed message.

Some examples of the method, first wireless communication devices, and non-transitory computer-readable medium described herein may further include operations, features, means, or instructions for transmitting, to the second wireless communication device, capability signaling indicating a capability of the first wireless communication device to transmit beamformed messages, where the first wireless communication device may be a station (STA), where the second wireless communication device may be an access point (AP), where the control signaling may be received from the second wireless communication device, and where the control signaling schedules the first wireless communication device to transmit the beamformed message.

In some examples of the method, first wireless communication devices, and non-transitory computer-readable medium described herein, the first wireless communication device may be an AP associated with a basic service set (BSS) identifier, the second wireless communication device may be a STA, the control signaling may be transmitted by the first wireless communication device, and the control signaling indicates the BSS identifier.

Some examples of the method, first wireless communication devices, and non-transitory computer-readable medium described herein may further include operations, features, means, or instructions for applying a first v-smooth filtering process in a first tone domain to a packet mapped to the set of frequency tones and applying a second v-smooth filtering process to the packet in a second tone domain subsequent to applying the first v-smooth filtering process, where satisfaction of the delay spread threshold may be based on application of at least one of the first v-smooth filtering process or the second v-smooth filtering process.

In some examples of the method, first wireless communication devices, and non-transitory computer-readable medium described herein, the indication in the control signaling may be associated with an expectation that the beamformed message will satisfy at least one of the delay spread threshold or the phase alignment threshold.

In some examples of the method, first wireless communication devices, and non-transitory computer-readable medium described herein, the delay spread threshold may be less than −X dBc power outside of a Y nanosecond time interval.

Another innovative aspect of the subject matter described in this disclosure can be implemented in a method for wireless communications by a second wireless communication device. The method may include communicating, with a first wireless communication device, control signaling that indicates that the first wireless communication device is scheduled to transmit a beamformed message to the second wireless communication device, and where the control signaling includes an indication that the second wireless communication device is to apply channel smoothing filtering to the beamformed message, receiving, from the first wireless communication device, the beamformed message via a set of frequency tones, where one or both of the beamformed message satisfies a delay spread threshold or a phase alignment of the beamformed message associated with the set of frequency tones satisfies a phase alignment threshold, and applying, in association with the control signaling, channel smoothing filtering to the beamformed message.

Another innovative aspect of the subject matter described in this disclosure can be implemented in a second wireless communication device for wireless communications. The second wireless communication device may include a processing system that includes processor circuitry and memory circuitry that stores code. The processing system may be configured to cause the second wireless communication device to communicate, with a first wireless communication device, control signaling that indicates that the first wireless communication device is scheduled to transmit a beamformed message to the second wireless communication device, and where the control signaling includes an indication that the second wireless communication device is to apply channel smoothing filtering to the beamformed message, receive, from the first wireless communication device, the beamformed message via a set of frequency tones, where one or both of the beamformed message satisfies a delay spread threshold or a phase alignment of the beamformed message associated with the set of frequency tones satisfies a phase alignment threshold, and apply, in association with the control signaling, channel smoothing filtering to the beamformed message.

Another innovative aspect of the subject matter described in this disclosure can be implemented in another second wireless communication device for wireless communications. The second wireless communication device may include means for communicating, with a first wireless communication device, control signaling that indicates that the first wireless communication device is scheduled to transmit a beamformed message to the second wireless communication device, and where the control signaling includes an indication that the second wireless communication device is to apply channel smoothing filtering to the beamformed message, means for receiving, from the first wireless communication device, the beamformed message via a set of frequency tones, where one or both of the beamformed message satisfies a delay spread threshold or a phase alignment of the beamformed message associated with the set of frequency tones satisfies a phase alignment threshold, and means for applying, in association with the control signaling, channel smoothing filtering to the beamformed message.

Another innovative aspect of the subject matter described in this disclosure can be implemented in a non-transitory computer-readable medium storing code for wireless communications. The code may include instructions executable by one or more processors to communicate, with a first wireless communication device, control signaling that indicates that the first wireless communication device is scheduled to transmit a beamformed message to the second wireless communication device, and where the control signaling includes an indication that the second wireless communication device is to apply channel smoothing filtering to the beamformed message, receive, from the first wireless communication device, the beamformed message via a set of frequency tones, where one or both of the beamformed message satisfies a delay spread threshold or a phase alignment of the beamformed message associated with the set of frequency tones satisfies a phase alignment threshold, and apply, in association with the control signaling, channel smoothing filtering to the beamformed message.

In some examples of the method, second wireless communication devices, and non-transitory computer-readable medium described herein, communicating the control signaling may include operations, features, means, or instructions for receiving a control message that includes a first field that indicates that the first wireless communication device may be scheduled to transmit the beamformed message, where the control message includes a second field that includes the indication that the second wireless communication device may be to apply channel smoothing filtering to the beamformed message.

In some examples of the method, second wireless communication devices, and non-transitory computer-readable medium described herein, the control signaling includes an indication of a device type of the first wireless communication device, the indication of the device type indicates that the first wireless communication device may be scheduled to transmit the beamformed message, and the indication of the device type may be the indication that the second wireless communication device may be to apply channel smoothing filtering to the beamformed message.

In some examples of the method, second wireless communication devices, and non-transitory computer-readable medium described herein, communicating the control signaling may include operations, features, means, or instructions for receiving a first control message that indicates that the first wireless communication device may be scheduled to transmit the beamformed message to the second wireless communication device, transmitting a second control message that indicates a feedback type and receiver type of the second wireless communication device, and receiving, in response to the second control message, a third control message that includes the indication that the second wireless communication device may be to apply channel smoothing filtering to the beamformed message.

Some examples of the method, second wireless communication devices, and non-transitory computer-readable medium described herein may further include operations, features, means, or instructions for receiving, from the first wireless communication device, capability signaling indicating a capability of the first wireless communication device to transmit beamformed messages, where the first wireless communication device may be a STA, where the second wireless communication device may be an AP, where the control signaling may be transmitted to the first wireless communication device, and where the control signaling schedules the first wireless communication device to transmit the beamformed message.

In some examples of the method, second wireless communication devices, and non-transitory computer-readable medium described herein, communicating the control signaling may include operations, features, means, or instructions for receiving, from the first wireless communication device, capability signaling indicating a capability of the first wireless communication device to transmit beamformed messages, where the first wireless communication device may be a STA, and where the second wireless communication device may be an AP and receiving, from the first wireless communication device, a null data packet (NDP) announcement frame that indicates a transmitter address (TA) corresponding to the first wireless communication device and a receiver address (RA) corresponding to the second wireless communication device for the beamformed message.

Some examples of the method, second wireless communication devices, and non-transitory computer-readable medium described herein may further include operations, features, means, or instructions for applying the channel smoothing filtering to the beamformed message includes applying one or more open loop filters to the beamformed message.

In some examples of the method, second wireless communication devices, and non-transitory computer-readable medium described herein, the indication in the control signaling may be associated with an expectation that the beamformed message will satisfy at least one of the delay spread threshold or the phase alignment threshold.

In some examples of the method, second wireless communication devices, and non-transitory computer-readable medium described herein, the delay spread threshold may be less than $-X$ dBc power outside of a Y nanosecond time interval.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 7 shows a flowchart illustrating an example process performable by or at a first wireless communication device that supports coordination for smooth beamforming.

FIG. 8 shows a flowchart illustrating an example process performable by or at a second wireless communication device that supports coordination for smooth beamforming.

Like reference numbers and designations in the various drawings indicate like elements.

DETAILED DESCRIPTION

Figure 1:
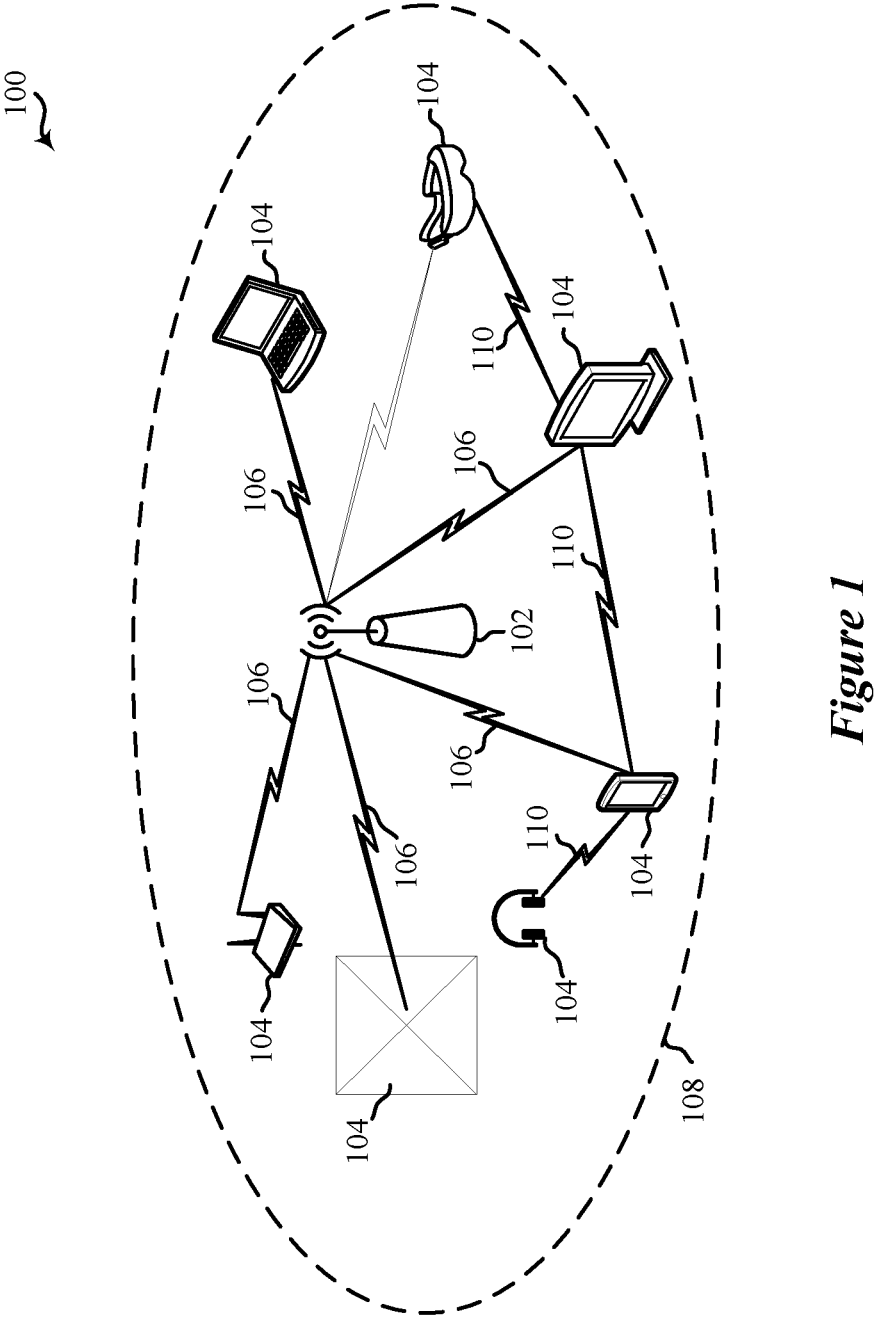
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G, 5G (New Radio (NR)) or 6G standards promulgated by the 3rd Generation Partnership Project (3GPP), among others. The described examples can be implemented in any suitable device, component, system or network that is capable of transmitting and receiving RF signals according to one or more of the following technologies or techniques: code division multiple access (CDMA), time division multiple access (TDMA), orthogonal frequency division multiplexing (OFDM), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO (MU-MIMO). The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), a non-terrestrial network (NTN), or an internet of things (IOT) network.

Various aspects relate generally to application by a transmitting device of techniques to reduce phase misalignment and/or delay spread to beamformed messages (also referred to as beamformed transmissions) such that a receiving device may apply channel smoothing filtering to the received beamformed message. For example, a transmitting device may perform interpolation from Ng=4 to all tones on which the beamformed transmission is transmitted to reduce phase misalignments caused by singular value decomposition (SVD). For example, compressed beamforming feedback (CBF) may be provided for every fourth tone (for example, Ng=4), and thus interpolation may be performed for the other tones. Phase alignment may be performed to avoid errors when computing the steering vectors for the missing tones during interpolation (for example, from Ng=4 to all the included tones). In some examples, the transmitting device may ensure that the delay spread of the steered channel for a beamformed transmission is roughly equal to an open-loop channel delay spread (for example, in the statistical sense). An open loop channel may refer to a channel without channel state information (CSI) feedback from the receiving device to the transmitting device, and thus without beamforming messages (for example, steering messages) using the CSI. Some aspects more specifically relate to an indication by the transmitting device to the receiving device for the receiving device to perform channel smoothing filtering to a received beamformed message, for example, because the transmitting device applies techniques to reduce the phase misalignment and delay spread to the beamformed message. In some examples, based on the indication, the receiving device may apply channel smoothing filtering to a beamformed transmission received from the transmitting device. For example, a dedicated bit or field in a signal field may be used to indicate for the receiving device to perform the channel smoothing filtering. As another example, the transmitting device may indicate the device type of the transmitting device, and based on the device type, the receiving device may expect that the transmitting device will perform correction of phase misalignment and reduction of delay spread to enable channel smoothing. As another example, the receiving device and the transmitting device may exchange capability signaling (such as via vendor specific action frames) that indicate that the receiving device is capable of performing channel smoothing filtering and that the transmitting device is capable of performing correction of phase misalignment and reduction of delay spread.

Particular aspects of the subject matter described in this disclosure can be implemented to realize one or more of the following potential advantages. In some examples, by applying techniques to reduce phase misalignment and delay spread to a beamformed message, the described techniques can be used to enable a receiving device to apply channel smoothing filtering to the received beamformed message without introducing error or potential packet loss. Use of beamforming and channel smoothing filtering at the receiving device may achieve beamforming gain and channel smoothing gain as compared to transmission over multipath channels. Additionally, the transmitting device may apply techniques to reduce phase misalignment and delay spread that do not alter computed precoder weights. The transmitting device may indicate to the receiving device to perform channel smoothing filtering for a beamformed message without addition of significant control signaling overhead (such as a bit or field may indicate for the receiving device to perform channel smoothing filtering).

FIG. 1 shows a pictorial diagram of an example wireless communication network 100. According to some aspects, the wireless communication network 100 can be an example of a wireless local area network (WLAN) such as a Wi-Fi network. For example, the wireless communication network 100 can be a network implementing at least one of the IEEE 802.11 family of wireless communication protocol standards (such as defined by the IEEE 802.11-2020 specification or amendments thereof including, but not limited to, 802.11ay, 802.11ax, 802.11az, 802.11ba, 802.11bc, 802.11bd, 802.11be, 802.11bf, and 802.11bn). In some other examples, the wireless communication network 100 can be an example of a cellular radio access network (RAN), such as a 5G or 6G RAN that implements one or more cellular protocols such as those specified in one or more 3GPP standards. In some other examples, the wireless communication network 100 can include a WLAN that functions in an interoperable or converged manner with one or more cellular RANs to provide greater or enhanced network coverage to wireless communication devices within the wireless communication network 100 or to enable such devices to connect to a cellular network's core, such as to access the network management capabilities and functionality offered by the cellular network core. In some other examples, the wireless communication network 100 can include a WLAN that functions in an interoperable or converged manner with one or more personal area networks, such as a network implementing Bluetooth or other wireless technologies, to provide greater or enhanced network coverage or to provide or enable other capabilities, functionality, applications or services.

The wireless communication network 100 may include numerous wireless communication devices including at least one wireless access point (AP) 102 and any number of wireless stations (STAs) 104. While only one AP 102 is shown in FIG. 1, the wireless communication network 100 can include multiple APs 102. The AP 102 can be or represent various different types of network entities including, but not limited to, a home networking AP, an enterprise-level AP, a single-frequency AP, a dual-band simultaneous (DBS) AP, a tri-band simultaneous (TBS) AP, a standalone AP, a non-standalone AP, a software-enabled AP (soft AP), and a multi-link AP (also referred to as an AP multi-link device (MLD)), as well as cellular (such as 3GPP, 4G LTE, 5G or 6G) base stations or other cellular network nodes such as a Node B, an evolved Node B (eNB), a gNB, a transmission reception point (TRP) or another type of device or equipment included in a radio access network (RAN), including Open-RAN (O-RAN) network entities, such as a central unit (CU), a distributed unit (DU) or a radio unit (RU).

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, other handheld or wearable communication devices, netbooks, notebook computers, tablet computers, laptops, Chromebooks, augmented reality (AR), virtual reality (VR), mixed reality (MR) or extended reality (XR) wireless headsets or other peripheral devices, wireless earbuds, other wearable devices, display devices (for example, TVs, computer monitors or video gaming consoles), video game controllers, navigation systems, music or other audio or stereo devices, remote control devices, printers, kitchen appliances (including smart refrigerators) or other household appliances, key fobs (for example, for passive keyless entry and start (PKES) systems), Internet of Things (IOT) devices, and vehicles, among other examples.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the wireless communication network 100. The BSS may be identified by STAs 104 and other devices by a service set identifier (SSID), as well as a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function (TSF) for establishing or maintaining timing synchronization with the AP 102. The AP 102 may provide access to external networks to various STAs 104 in the wireless communication network 100 via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHZ, 6 GHz, 45 GHz, or 60 GHz bands). To perform passive scanning, a STA 104 listens for beacons, which are transmitted by respective APs 102 at periodic time intervals referred to as target beacon transmission times (TBTTs). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The selected AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an extended service set (ESS) including multiple connected BSSs. For example, the wireless communication network 100 may be connected to a wired or wireless distribution system that may enable multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some examples, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some examples, ad hoc networks may be implemented within a larger network such as the wireless communication network 100. In such examples, while the STAs 104 may be capable of communicating with each other through the AP 102 using communication links 106, STAs 104 also can communicate directly with each other via direct wireless communication links 110. Additionally, two STAs 104 may communicate via a direct wireless communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

In some networks, the AP 102 or the STAs 104, or both, may support applications associated with high throughput or low-latency requirements, or may provide lossless audio to one or more other devices. For example, the AP 102 or the STAs 104 may support applications and use cases associated with ultra-low-latency (ULL), such as ULL gaming, or streaming lossless audio and video to one or more personal audio devices (such as peripheral devices) or AR/VR/MR/XR headset devices. In scenarios in which a user uses two or more peripheral devices, the AP 102 or the STAs 104 may support an extended personal audio network enabling communication with the two or more peripheral devices. Additionally, the AP 102 and STAs 104 may support additional ULL applications such as cloud-based applications (such as VR cloud gaming) that have ULL and high throughput requirements.

As indicated above, in some implementations, the AP 102 and the STAs 104 may function and communicate (via the respective communication links 106) according to one or more of the IEEE 802.11 family of wireless communication protocol standards. These standards define the WLAN radio and baseband protocols for the physical (PHY) and MAC layers. The AP 102 and STAs 104 transmit and receive wireless communications (hereinafter also referred to as "Wi-Fi communications" or "wireless packets") to and from one another in the form of PHY protocol data units (PPDUs).

Each PPDU is a composite structure that includes a PHY preamble and a payload that is in the form of a PHY service data unit (PSDU). The information provided in the preamble may be used by a receiving device to decode the subsequent data in the PSDU. In instances in which a PPDU is transmitted over a bonded or wideband channel, the preamble fields may be duplicated and transmitted in each of multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 wireless communication protocol to be used to transmit the payload.

The APs 102 and STAs 104 in the wireless communication network 100 may transmit PPDUs over an unlicensed spectrum, which may be a portion of spectrum that includes frequency bands traditionally used by Wi-Fi technology, such as the 2.4 GHZ, 5 GHz, 6 GHZ, 45 GHz, and 60 GHz bands. Some examples of the APs 102 and STAs 104 described herein also may communicate in other frequency bands that may support licensed or unlicensed communications. For example, the APs 102 or STAs 104, or both, also may be capable of communicating over licensed operating bands, where multiple operators may have respective licenses to operate in the same or overlapping frequency ranges. Such licensed operating bands may map to or be associated with frequency range designations of FR1 (410 MHZ-7.125 GHZ), FR2 (24.25 GHZ-52.6 GHZ), FR3 (7.125 GHz-24.25 GHZ), FR4a or FR4-1 (52.6 GHZ-71 GHZ), FR4 (52.6 GHz-114.25 GHZ), and FR5 (114.25 GHz-300 GHz).

Each of the frequency bands may include multiple subbands and frequency channels (also referred to as subchannels). The terms "channel" and "subchannel" may be used interchangeably herein, as each may refer to a portion of frequency spectrum within a frequency band (for example, a 20 MHz, 40 MHZ, 80 MHz, or 160 MHZ portion of frequency spectrum) via which communication between two or more wireless communication devices can occur. For example, PPDUs conforming to the IEEE 802.11n, 802.11ac, 802.11ax, 802.11be and 802.11bn standard amendments may be transmitted over one or more of the 2.4 GHZ, 5 GHZ, or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHZ, 160 MHZ, 240 MHZ, 320 MHz, 480 MHz, or 640 MHz by bonding together multiple 20 MHz channels.

An AP 102 may determine or select an operating or operational bandwidth for the STAs 104 in its BSS and select a range of channels within a band to provide that operating bandwidth. For example, the AP 102 may select sixteen 20 MHz channels that collectively span an operating bandwidth of 320 MHz. Within the operating bandwidth, the AP 102 may typically select a single primary 20 MHz channel on which the AP 102 and the STAs 104 in its BSS monitor for contention-based access schemes. In some examples, the AP 102 or the STAs 104 may be capable of monitoring only a single primary 20 MHz channel for packet detection (for example, for detecting preambles of PPDUs). Conventionally, any transmission by an AP 102 or a STA 104 within a BSS must involve transmission on the primary 20 MHz channel. As such, in conventional systems, the transmitting device must contend on and win a TXOP on the primary channel to transmit anything at all. However, some APs 102 and STAs 104 supporting ultra-high reliability (UHR) communications or communication according to the IEEE 802.11bn standard amendment can be configured to operate, monitor, contend and communicate using multiple primary 20 MHz channels. Such monitoring of multiple primary 20 MHz channels may be sequential such that responsive to determining, ascertaining or detecting that a first primary 20 MHz channel is not available, a wireless communication device may switch to monitoring and contending using a second primary 20 MHz channel. Additionally, or alternatively, a wireless communication device may be configured to monitor multiple primary 20 MHz channels in parallel. In some examples, a first primary 20 MHz channel may be referred to as a main primary (M-Primary) channel and one or more additional, second primary channels may each be referred to as an opportunistic primary (O-Primary) channel. For example, if a wireless communication device measures, identifies, ascertains, detects, or otherwise determines that the M-Primary channel is busy or occupied (such as due to an overlapping BSS (OBSS) transmission), the wireless communication device may switch to monitoring and contending on an O-Primary channel. In some examples, the M-Primary channel may be used for beaconing and serving legacy client devices and an O-Primary channel may be specifically used by non-legacy (for example, UHR- or IEEE 802.11bn-compatible) devices for opportunistic access to spectrum that may be otherwise under-utilized.

Figure 2:
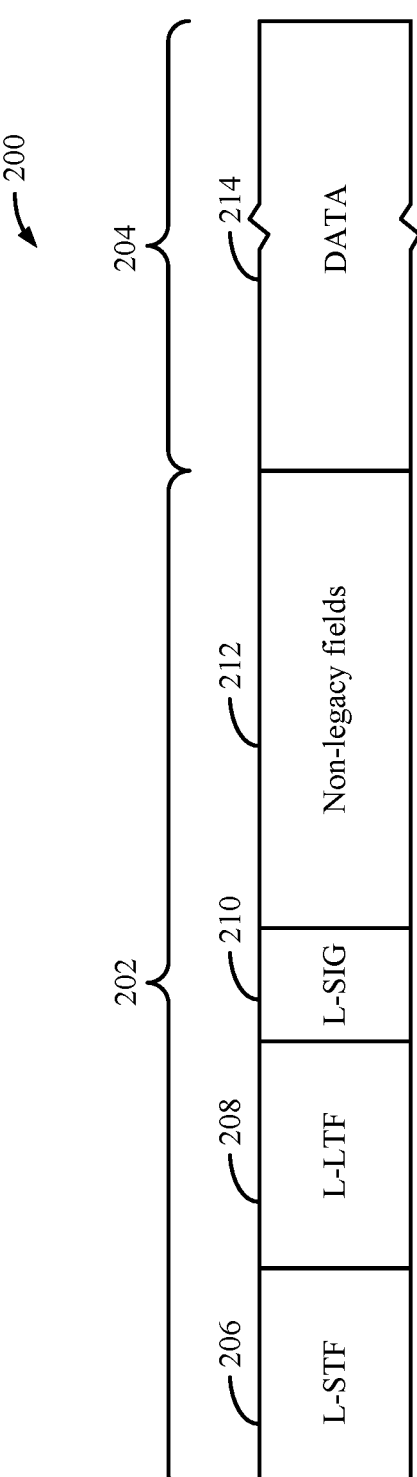
FIG. 2 shows an example protocol data unit (PDU) usable for communications between a wireless access point (AP) and one or more wireless stations (STAs).

FIG. 2 shows an example protocol data unit (PDU) 200 usable for wireless communication between a wireless AP and one or more wireless STAs. For example, the AP and STAs may be examples of the AP 102 and the STAs 104 described with reference to FIG. 1. The PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two symbols, a legacy long training field (L-LTF) 208, which may consist of two symbols, and a legacy signal field (L-SIG) 210, which may consist of two symbols. The legacy portion of the preamble 202 may be configured according to the IEEE 802.11a wireless communication protocol standard. The preamble 202 also may include a non-legacy portion including one or more non-legacy fields 212, for example, conforming to one or more of the IEEE 802.11 family of wireless communication protocol standards.

The L-STF 206 generally enables a receiving device (such as an AP 102 or a STA 104) to perform coarse timing and frequency tracking and automatic gain control (AGC). The L-LTF 208 generally enables the receiving device to perform fine timing and frequency tracking and also to perform an initial estimate of the wireless channel. The L-SIG 210 generally enables the receiving device to determine (for example, obtain, select, identify, detect, ascertain, calculate, or compute) a duration of the PDU and to use the determined duration to avoid transmitting on top of the PDU. The legacy portion of the preamble, including the L-STF 206, the L-LTF 208 and the L-SIG 210, may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of MAC protocol data units (MPDUs) or an aggregated MPDU (A-MPDU).

Figure 3:
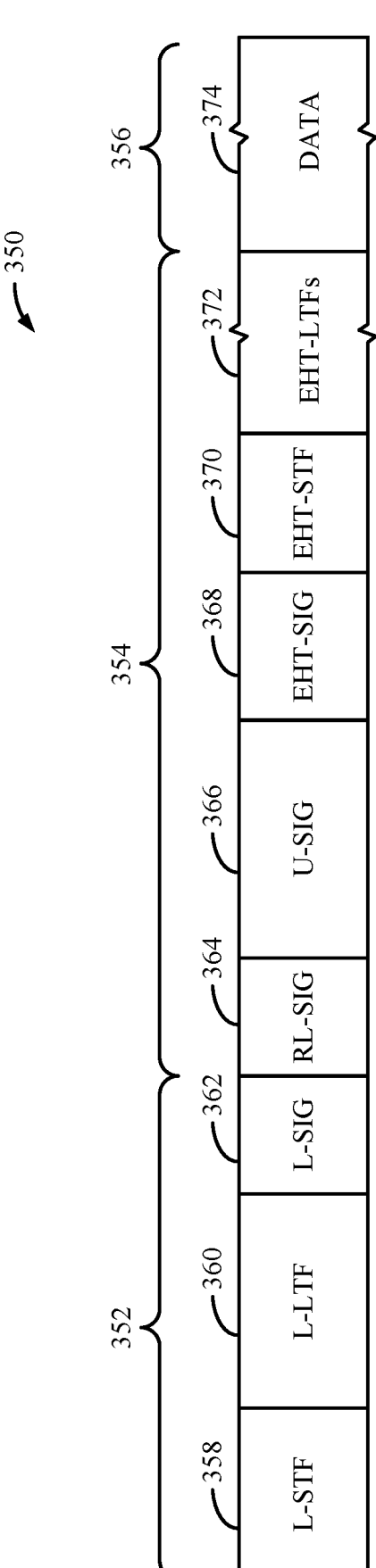
FIG. 3 shows an example physical layer (PHY) protocol data unit (PPDU) usable for communications between a wireless AP and one or more wireless STAs.

FIG. 3 shows an example physical layer (PHY) protocol data unit (PPDU) 350 usable for communications between a wireless AP and one or more wireless STAs. For example, the AP and STAs may be examples of the AP 102 and the STAs 104 described with reference to FIG. 1. As shown, the PPDU 350 includes a PHY preamble, that includes a legacy portion 352 and a non-legacy portion 354, and a payload 356 that includes a data field 374. The legacy portion 352 of the preamble includes an L-STF 358, an L-LTF 360, and an L-SIG 362. The non-legacy portion 354 of the preamble includes a repetition of L-SIG (RL-SIG) 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. One or both of U-SIG 366 and EHT-SIG 368 may be structured as, and carry version-dependent information for, other wireless communication protocol versions associated with amendments to the IEEE family of standards beyond EHT. For example, U-SIG 366 may be used by a receiving device (such as an AP 102 or a STA 104) to interpret bits in one or more of EHT-SIG 368 or the data field 374. Like L-STF 358, L-LTF 360, and L-SIG 362, the information in U-SIG 366 and EHT-SIG 368 may be duplicated and transmitted in each of the component 20 MHz channels in instances involving the use of a bonded channel.

The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). EHT-STF 370 may be used for timing and frequency tracking and AGC, and EHT-LTF 372 may be used for more refined channel estimation.

EHT-SIG 368 may be used by an AP 102 to identify and inform one or multiple STAs 104 that the AP 102 has scheduled uplink (UL) or downlink (DL) resources for them. EHT-SIG 368 may be decoded by each compatible STA 104 served by the AP 102. EHT-SIG 368 may generally be used by the receiving device to interpret bits in the data field 374. For example, EHT-SIG 368 may include resource unit (RU) allocation information, spatial stream configuration information, and per-user (for example, STA-specific) signaling information. Each EHT-SIG 368 may include a common field and at least one user-specific field. In the context of OFDMA, the common field can indicate RU distributions to multiple STAs 104, indicate the RU assignments in the frequency domain, indicate which RUs are allocated for MU-MIMO transmissions and which RUs correspond to OFDMA transmissions, and the number of users in allocations, among other examples. The user-specific fields are assigned to particular STAs 104 and carry STA-specific scheduling information such as user-specific MCS values and user-specific RU allocation information. Such information enables the respective STAs 104 to identify and decode corresponding RUs in the associated data field 374.

Some APs and STAs (for example, the AP 102 and the STAs 104 described with reference to FIG. 1) may implement spatial reuse techniques. For example, APs 102 and STAs 104 configured for communications using the protocols defined in the IEEE 802.11ax or 802.11be standard amendments may be configured with a BSS color. APs 102 associated with different BSSs may be associated with different BSS colors. A BSS color is a numerical identifier of an AP 102's respective BSS (such as a 6 bit field carried by the SIG field). Each STA 104 may learn its own BSS color upon association with the respective AP 102. BSS color information is communicated at both the PHY and MAC sublayers. If an AP 102 or a STA 104 detects, obtains, selects, or identifies, a wireless packet from another wireless communication device while contending for access, the AP 102 or the STA 104 may apply different contention parameters in accordance with whether the wireless packet is transmitted by, or transmitted to, another wireless communication device (such another AP 102 or STA 104) within its BSS or from a wireless communication device from an overlapping BSS (OBSS), as determined, identified, ascertained, or calculated by a BSS color indication in a preamble of the wireless packet. For example, if the BSS color associated with the wireless packet is the same as the BSS color of the AP 102 or STA 104, the AP 102 or STA 104 may use a first RSSI detection threshold when performing a CCA on the wireless channel. However, if the BSS color associated with the wireless packet is different than the BSS color of the AP 102 or STA 104, the AP 102 or STA 104 may use a second RSSI detection threshold in lieu of using the first RSSI detection threshold when performing the CCA on the wireless channel, the second RSSI detection threshold being greater than the first RSSI detection threshold. In this way, the criteria for winning contention are relaxed when interfering transmissions are associated with an OBSS.

Some APs and STAs (for example, the AP 102 and the STAs 104 described with reference to FIG. 1) may implement techniques for spatial reuse that involve participation in a coordinated communication scheme. According to such techniques, an AP 102 may contend for access to a wireless medium to obtain control of the medium for a TXOP. The AP that wins the contention (hereinafter also referred to as a "sharing AP") may select one or more other APs (hereinafter also referred to as "shared APs") to share resources of the TXOP. The sharing and shared APs may be located in proximity to one another such that at least some of their wireless coverage areas at least partially overlap. Some examples may specifically involve coordinated AP TDMA or OFDMA techniques for sharing the time or frequency resources of a TXOP. To share its time or frequency resources, the sharing AP may partition the TXOP into multiple time segments or frequency segments each including respective time or frequency resources representing a portion of the TXOP. The sharing AP may allocate the time or frequency segments to itself or to one or more of the shared APs. For example, each shared AP may utilize a partial TXOP assigned by the sharing AP for its uplink or downlink communications with its associated STAs.

In some examples of such TDMA techniques, each portion of a plurality of portions of the TXOP includes a set of time resources that do not overlap with any time resources of any other portion of the plurality of portions of the TXOP. In such examples, the scheduling information may include an indication of time resources, of multiple time resources of the TXOP, associated with each portion of the TXOP. For example, the scheduling information may include an indication of a time segment of the TXOP such as an indication of one or more slots or sets of symbol periods associated with each portion of the TXOP such as for multi-user TDMA.

In some examples of OFDMA techniques, each portion of the plurality of portions of the TXOP includes a set of frequency resources that do not overlap with any frequency resources of any other portion of the plurality of portions. In such examples, the scheduling information may include an indication of frequency resources, of multiple frequency resources of the TXOP, associated with each portion of the TXOP. For example, the scheduling information may include an indication of a bandwidth portion of the wireless channel such as an indication of one or more subchannels or resource units associated with each portion of the TXOP such as for multi-user OFDMA.

In this manner, the sharing AP's acquisition of the TXOP enables communication between one or more additional shared APs and their respective BSSs, subject to appropriate power control and link adaptation. For example, the sharing AP may limit the transmit powers of the selected shared APs such that interference from the selected APs does not prevent STAs associated with the TXOP owner from successfully decoding packets transmitted by the sharing AP. Such techniques may be used to reduce latency because the other APs may not need to wait to win contention for a TXOP to be able to transmit and receive data according to conventional CSMA/CA or enhanced distributed channel access (EDCA) techniques. Additionally, by enabling a group of APs 102 associated with different BSSs to participate in a coordinated AP transmission session, during which the group of APs may share at least a portion of a single TXOP obtained by any one of the participating APs, such techniques may increase throughput across the BSSs associated with the participating APs and also may achieve improvements in throughput fairness. Furthermore, with appropriate selection of the shared APs and the scheduling of their respective time or frequency resources, medium utilization may be maximized or otherwise increased while packet loss resulting from OBSS interference is minimized or otherwise reduced. Various implementations may achieve these and other advantages without requiring that the sharing AP or the shared APs be aware of the STAs 104 associated with other BSSs, without requiring a preassigned or dedicated master AP or preassigned groups of APs, and without requiring backhaul coordination between the APs participating in the TXOP.

In some examples in which the signal strengths or levels of interference associated with the selected APs are relatively low (such as less than a given value), or when the decoding error rates of the selected APs are relatively low (such as less than a threshold), the start times of the communications among the different BSSs may be synchronous. Conversely, when the signal strengths or levels of interference associated with the selected APs are relatively high (such as greater than the given value), or when the decoding error rates of the selected APs are relatively high (such as greater than the threshold), the start times may be offset from one another by a time period associated with decoding the preamble of a wireless packet and determining, from the decoded preamble, whether the wireless packet is an intra-BSS packet or is an OBSS packet. For example, the time period between the transmission of an intra-BSS packet and the transmission of an OBSS packet may allow a respective AP (or its associated STAs) to decode the preamble of the wireless packet and obtain the BSS color value carried in the wireless packet to determine whether the wireless packet is an intra-BSS packet or an OBSS packet. In this manner, each of the participating APs and their associated STAs may be able to receive and decode intra-BSS packets in the presence of OBSS interference.

In some examples, the sharing AP may perform polling of a set of un-managed or non-co-managed APs that support coordinated reuse to identify candidates for future spatial reuse opportunities. For example, the sharing AP may transmit one or more spatial reuse poll frames as part of determining one or more spatial reuse criteria and selecting one or more other APs to be shared APs. According to the polling, the sharing AP may receive responses from one or more of the polled APs. In some specific examples, the sharing AP may transmit a coordinated AP TXOP indication (CTI) frame to other APs that indicates time and frequency of resources of the TXOP that can be shared. The sharing AP may select one or more candidate APs upon receiving a coordinated AP TXOP request (CTR) frame from a respective candidate AP that indicates a desire by the respective AP to participate in the TXOP. The poll responses or CTR frames may include a power indication, for example, a receive (RX) power or RSSI measured by the respective AP. In some other examples, the sharing AP may directly measure potential interference of a service supported (such as UL transmission) at one or more APs, and select the shared APs based on the measured potential interference. The sharing AP generally selects the APs to participate in coordinated spatial reuse such that it still protects its own transmissions (which may be referred to as primary transmissions) to and from the STAs in its BSS. The selected APs may be allocated resources during the TXOP as described above.

Retransmission protocols, such as hybrid automatic repeat request (HARQ), also may offer performance gains. A HARQ protocol may support various HARQ signaling between transmitting and receiving wireless communication devices (for example, the AP 102 and the STAs 104 described with reference to FIG. 1) as well as signaling between the PHY and MAC layers to improve the retransmission operations in a wireless communication network. HARQ uses a combination of error detection and error correction. For example, a HARQ transmission may include error checking bits that are added to data to be transmitted using an error-detecting (ED) code, such as a cyclic redundancy check (CRC). The error checking bits may be used by the receiving device to determine if it has properly decoded the received HARQ transmission. In some examples, the original data (information bits) to be transmitted may be encoded with a forward error correction (FEC) code, such as using a low-density parity check (LDPC) coding scheme that systematically encodes the information bits to produce parity bits. The transmitting device may transmit both the original information bits as well as the parity bits in the HARQ transmission to the receiving device. The receiving device may be able to use the parity bits to correct errors in the information bits, thus avoiding a retransmission.

Implementing a HARQ protocol in a wireless communication network may improve reliability of data communicated from a transmitting device to a receiving device. The HARQ protocol may support the establishment of a HARQ session between the two devices. Once a HARQ session is established, if a receiving device cannot properly decode (and cannot correct the errors) a first HARQ transmission received from the transmitting device, the receiving device may transmit a HARQ feedback message to the transmitting device (for example, a negative acknowledgment (NACK)) that indicates at least part of the first HARQ transmission was not properly decoded. Such a HARQ feedback message may be different than the traditional Block ACK feedback message type associated with conventional ARQ. In response to receiving the HARQ feedback message, the transmitting device may transmit a second HARQ transmission to the receiving device to communicate at least part of further assist the receiving device in decoding the first HARQ transmission. For example, the transmitting device may include some or all of the original information bits, some or all of the original parity bits, as well as other, different parity bits in the second HARQ transmission. The combined HARQ transmissions may be processed for decoding and error correction such that the complete signal associated with the HARQ transmissions can be obtained.

In some examples, the receiving device may be enabled to control whether to continue the HARQ process or revert to a non-HARQ retransmission scheme (such as an automatic repeat request (ARQ) protocol). Such switching may reduce feedback overhead and increase the flexibility for retransmissions by allowing devices to dynamically switch between ARQ and HARQ protocols during frame exchanges. Some implementations also may allow multiplexing of communications that employ ARQ with those that employ HARQ.

APs and STAs (for example, the AP 102 and the STAs 104 described with reference to FIG. 1) that include multiple antennas may support various diversity schemes. For example, spatial diversity may be used by one or both of a transmitting device (such as an AP 102 or a STA 104) or a receiving device (such as an AP 102 or a STA 104) to increase the robustness of a transmission. For example, to implement a transmit diversity scheme, a transmitting device may transmit the same data redundantly over two or more antennas.

APs 102 and STAs 104 that include multiple antennas also may support space-time block coding (STBC). With STBC, a transmitting device also transmits multiple copies of a data stream across multiple antennas to exploit the various received versions of the data to increase the likelihood of decoding the correct data. More specifically, the data stream to be transmitted is encoded in blocks, which are distributed among the spaced antennas and across time. Generally, STBC can be used when the number $N_{Tx}$ of transmit antennas exceeds the number $N_{SS}$ of spatial streams. The $N_{SS}$ spatial streams may be mapped to a number $N_{STS}$ of space-time streams, which are mapped to $N_{Tx}$ transmit chains.

APs 102 and STAs 104 that include multiple antennas also may support spatial multiplexing, which may be used to increase the spectral efficiency and the resultant throughput of a transmission. To implement spatial multiplexing, the transmitting device divides the data stream into a number $N_{SS}$ of separate, independent spatial streams. The spatial streams are separately encoded and transmitted in parallel via the multiple $N_{Tx}$ transmit antennas.

APs 102 and STAs 104 that include multiple antennas also may support beamforming. Beamforming generally refers to the steering of the energy of a transmission in the direction of a target receiver. Beamforming may be used both in a single-user (SU) context, for example, to improve a signal-to-noise ratio (SNR), as well as in a multi-user (MU) context, for example, to enable MU-MIMO transmissions (also referred to as spatial division multiple access (SDMA)). In the MU-MIMO context, beamforming may additionally, or alternatively, involve the nulling out of energy in the directions of other receiving devices. To perform SU beamforming or MU-MIMO, a transmitting device, referred to as the beamformer, transmits a signal from each of multiple antennas. The beamformer configures the amplitudes and phase shifts between the signals transmitted from the different antennas such that the signals add constructively along particular directions towards the intended receiver (referred to as the beamformee) or add destructively in other directions towards other devices to mitigate interference in a MU-MIMO context. The manner in which the beamformer configures the amplitudes and phase shifts depends on CSI associated with the wireless channels over which the beamformer intends to communicate with the beamformee.

To obtain the CSI necessary for beamforming, the beamformer may perform a channel sounding procedure with the beamformee. For example, the beamformer may transmit one or more sounding signals (for example, in the form of a null data packet (NDP)) to the beamformee. An NDP is a PPDU without any data field. The beamformee may perform measurements for each of the $N_{Tx} \times N_{Rx}$ sub-channels corresponding to all of the transmit antenna and receive antenna pairs associated with the sounding signal. The beamformee generates a feedback matrix associated with the channel measurements and, typically, compresses the feedback matrix before transmitting the feedback to the beamformer. The beamformer may generate a precoding (or "steering") matrix for the beamformee associated with the feedback and use the steering matrix to precode the data streams to configure the amplitudes and phase shifts for subsequent transmissions to the beamformee. The beamformer may use the steering matrix to determine (for example, identify, detect, ascertain, calculate, or compute) how to transmit a signal on each of its antennas to perform beamforming. For example, the steering matrix may be indicative of a phase shift, or a power level, to use to transmit a respective signal on each of the beamformer's antennas.

When performing beamforming, the transmitting beamforming array gain is logarithmically proportional to the ratio of $N_{Tx}$ to $N_{SS}$. As such, it is generally desirable, within other constraints, to increase the number $N_{Tx}$ of transmit antennas when performing beamforming to increase the gain. It is also possible to more accurately direct transmissions or nulls by increasing the number of transmit antennas. This is especially advantageous in MU transmission contexts in which it is particularly important to reduce inter-user interference.

To increase an AP 102's spatial multiplexing capability, an AP 102 may need to support an increased number of spatial streams (such as up to 16 spatial streams). However, supporting additional spatial streams may result in increased CSI feedback overhead. Implicit CSI acquisition techniques may avoid CSI feedback overhead by taking advantage of the assumption that the UL and DL channels have reciprocal impulse responses (that is, that there is channel reciprocity). For example, the CSI feedback overhead may be reduced using an implicit channel sounding procedure such as an implicit beamforming report (BFR) technique (such as where STAs 104 transmit NDP sounding packets in the UL while the AP 102 measures the channel) because no BFRs are sent. Once the AP 102 receives the NDPs, it may implicitly assess the channels for each of the STAs 104 and use the channel assessments to configure steering matrices. In order to mitigate hardware mismatches that could break the channel reciprocity on the UL and DL (such as the baseband-to-RF and RF-to-baseband chains not being reciprocal), the AP 102 may implement a calibration method to compensate for the mismatch between the UL and the DL channels. For example, the AP 102 may select a reference antenna, transmit a pilot signal from each of its antennas, and estimate baseband-to-RF gain for each of the non-reference antennas relative to the reference antenna.

In some examples, multiple APs 102 may simultaneously transmit signaling or communications to a single STA 104 utilizing a distributed MU-MIMO scheme. Examples of such a distributed MU-MIMO transmission include coordinated beamforming (CoBF) and joint transmission (JT). With CoBF, signals (such as data streams) for a given STA 104 may be transmitted by only a single AP 102. However, the coverage areas of neighboring APs may overlap, and signals transmitted by a given AP 102 may reach the STAs in OBSSs associated with neighboring APs as OBSS signals. CoBF allows multiple neighboring APs to transmit simultaneously while minimizing or avoiding interference, which may result in more opportunities for spatial reuse. More specifically, using CoBF techniques, an AP 102 may beamform signals to in-BSS STAs 104 while forming nulls in the directions of STAs in OBSSs such that any signals received at an OBSS STA are of sufficiently low power to limit the interference at the STA. To accomplish this, an inter-BSS coordination set may be defined between the neighboring APs, which contains identifiers of all APs and STAs participating in CoBF transmissions.

With JT, signals for a given STA 104 may be transmitted by multiple coordinated APs 102. For the multiple APs 102 to concurrently transmit data to a STA 104, the multiple APs 102 may all need a copy of the data to be transmitted to the STA 104. Accordingly, the APs 102 may need to exchange the data among each other for transmission to a STA 104. With JT, the combination of antennas of the multiple APs 102 transmitting to one or more STAs 104 may be considered as one large antenna array (which may be represented as a virtual antenna array) used for beamforming and transmitting signals. In combination with MU-MIMO techniques, the multiple antennas of the multiple APs 102 may be able to transmit data via multiple spatial streams. Accordingly, each STA 104 may receive data via one or more of the multiple spatial streams.

In some implementations, the AP 102 and STAs 104 can support various multi-user communications; that is, concurrent transmissions from one device to each of multiple devices (for example, multiple simultaneous downlink communications from an AP 102 to corresponding STAs 104), or concurrent transmissions from multiple devices to a single device (for example, multiple simultaneous uplink transmissions from corresponding STAs 104 to an AP 102). As an example, in addition to MU-MIMO, the AP 102 and STAs 104 may support OFDMA. OFDMA is in some aspects a multi-user version of OFDM.

In OFDMA schemes, the available frequency spectrum of the wireless channel may be divided into multiple resource units (RUs) each including multiple frequency subcarriers (also referred to as "tones"). Different RUs may be allocated or assigned by an AP 102 to different STAs 104 at particular times. The sizes and distributions of the RUs may be referred to as an RU allocation. In some examples, RUs may be allocated in 2 MHz intervals, and as such, the smallest RU may include 26 tones consisting of 24 data tones and 2 pilot tones. Consequently, in a 20 MHz channel, up to 9 RUs (such as 2 MHZ, 26-tone RUs) may be allocated (because some tones are reserved for other purposes). Similarly, in a 160 MHz channel, up to 74 RUs may be allocated. Other tone RUs also may be allocated, such as 52 tone, 106 tone, 242 tone, 484 tone and 996 tone RUs. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

As described herein, the wireless communication network 100 may support beamforming of communications between devices (such as downlink communications from an AP 102 to a STA 104 or uplink communications from a STA 104 to an AP 102. The transmitting device may use SVD techniques to generate beamformed transmissions. A receiving device may use channel smoothing, also referred to as noise filtering, to reduce channel estimation error by exploiting the correlation across the frequency-domain responses. As SVD may introduce phase misalignments across tones in the frequency domain, steered packet channel smoothing for beamformed transmissions at the receiving device may be challenging and may result in error or packet loss. Some modifications at the receiving device (the beamformee) side for beamforming have been shown not to achieve additional gain associated with channel smoothing filtering. For example, such modifications may include altering beamformee feedback during channel estimation, such as smooth SVD (SSVD) coordinated beamforming generation or U'/Q' based channel smoothing (such as rotating the estimated channel vectors by a unitary matrix adapted to the constellation and/or adapted to the specific beamformed transmission) by the receiving device during the channel estimation. Another possible modification for beamforming may be Q-rotation at the transmitting device (the beamformer) to perform phase alignment without altering beamformee feedback. Q-rotation may involve performing phase alignment across each set of 3 consecutive (for example, adjacent) tones across the channel. Such Q-rotation, however, may not provide gains for all channels and may be computationally complex to implement.

In some examples, the transmitting device may apply techniques to reduce phase misalignment and delay spread to beamformed messages such that the delay spread meets a threshold level such that a receiving device may apply channel smoothing filtering to the received beamformed message. For example, the transmitting device may ensure that the phases of the tones are within a phase alignment threshold such that the delay spread of the steered channel is roughly matching to the open loop channel. The transmitting device may indicate for the receiving device to perform channel smoothing filtering to a beamformed message, and based on the indication, the receiving device may apply channel smoothing filtering to a beamformed transmission received from the transmitting device. As the delay spread may be roughly matching to the open loop channel, the receiving device may use the same filter used for open loop channel smoothing filtering for channel smoothing filtering for beamformed messages. Such techniques may work for different steered packet types, such as SU transmitter beamforming, downlink MU, and uplink MU precoding. Such techniques also may work for different beamforming channel feedback types, including vector (V)-precoding and any approximation to SVD or V-precoding. Such techniques may involve adaptations to V-smoothing and may not involve Q-rotation. For example, transmitting devices (for example, APs 102 or STAs 104) may apply aggressive smoothing filtering (for example, V-smoothing) in the frequency domain at the MU transmit beamformer output after interpolation, which may ensure that the channel delay spread roughly matches the open loop channel. For example, the filtering in the frequency domain may involve applying a smoothing filter across the set of frequency tones associated with the reconstructed channel matrix using the received feedback from the receiving device.

Figure 4:
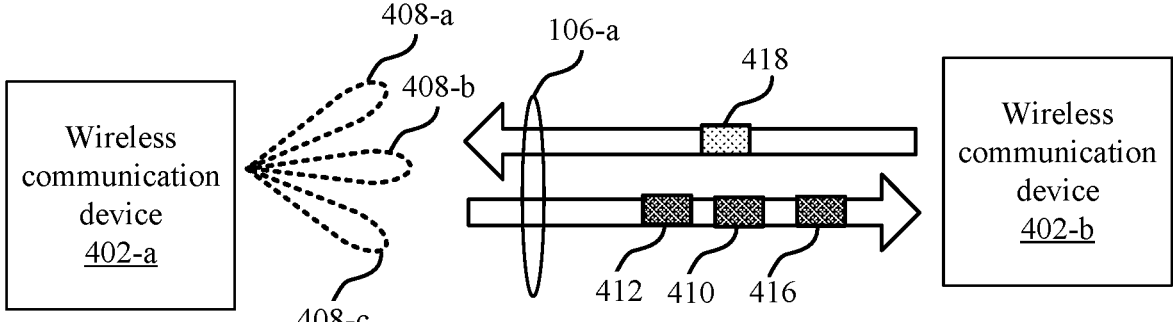
FIG. 4 shows an example of a signaling diagram that supports coordination for smooth beamforming.
Figure 4:
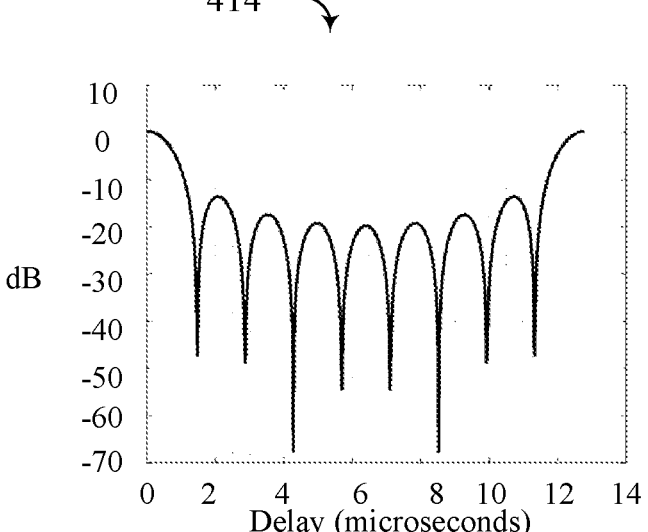

FIG. 4 shows an example of a signaling diagram 400 that supports coordination for smooth beamforming. The signaling diagram may implement or may be implemented by the wireless communication network 100. For example, in the signaling diagram 400, a wireless communication device 402-a may communicate with a wireless communication device 402-b using a communication link 106-a. The wireless communication device 402-a may be an example of an AP 102 or a STA 104 as described herein. The wireless communication device 402-b may be an example of an AP 102 or a STA 104 as described herein. The communication link 106-a may be an example of a communication link 106 as described herein.

The wireless communication device 402-a may include multiple antennas and may support beamforming. For example, the wireless communication device 402-a may use beamforming techniques to transmit communications using one or more beams 408 (for example, a beam 408-a, a beam 408-b, or a beam 408-c). For example, the wireless communication device 402-a may transmit a beamformed message 412 to the wireless communication device 402-b over the communication link 106-a using the beam 408-b, and the wireless communication device 402-b may be in the direction of the beam 408-b. In some examples, the wireless communication device 402-a may transmit an NDP 416 to the wireless communication device 402-b. The wireless communication device 402-b may estimate the channel between the wireless communication device 402-a and the wireless communication device 402-b based on the NDP 416. The wireless communication device 402-b may transmit a report 418 which indicates the estimated channel (for example, a CSI report), and the wireless communication device 402-a may use beamforming techniques as described herein to steer beamformed messages to the wireless communication device 402-b (such as via the beam 408-b).

As described herein, the wireless communication device 402-a may apply techniques to reduce phase misalignment and delay spread to beamformed messages such that the delay spread meets a threshold level (for example, roughly matching the delay spread of an open loop channel without beamforming). For example, the chart 414 displays an example filter response for a filter that the wireless communication device 402-a may apply to beamformed messages prior to transmission to ensure that the delay spread is roughly matching the delay spread of an open loop channel (for example, less than −X decibels relative to the carrier (dBc) power outside of a Y nanosecond time interval). For example, as shown in FIG. 4, the delay spread threshold may be −10 dBc for 2000 nanoseconds.

The wireless communication device 402-a may transmit control signaling 410 to the wireless communication device 402-b that indicates for the wireless communication device 402-b to perform channel smoothing filtering for the beamformed message 412. The wireless communication device 402-a may transmit the beamformed message 412, and the wireless communication device 402-b may receive the beamformed message 412. The wireless communication device 402-b may apply channel smoothing filtering to the beamformed message 412 based on the indication in the control signaling 410 to apply channel smoothing filtering.

Figure 5:
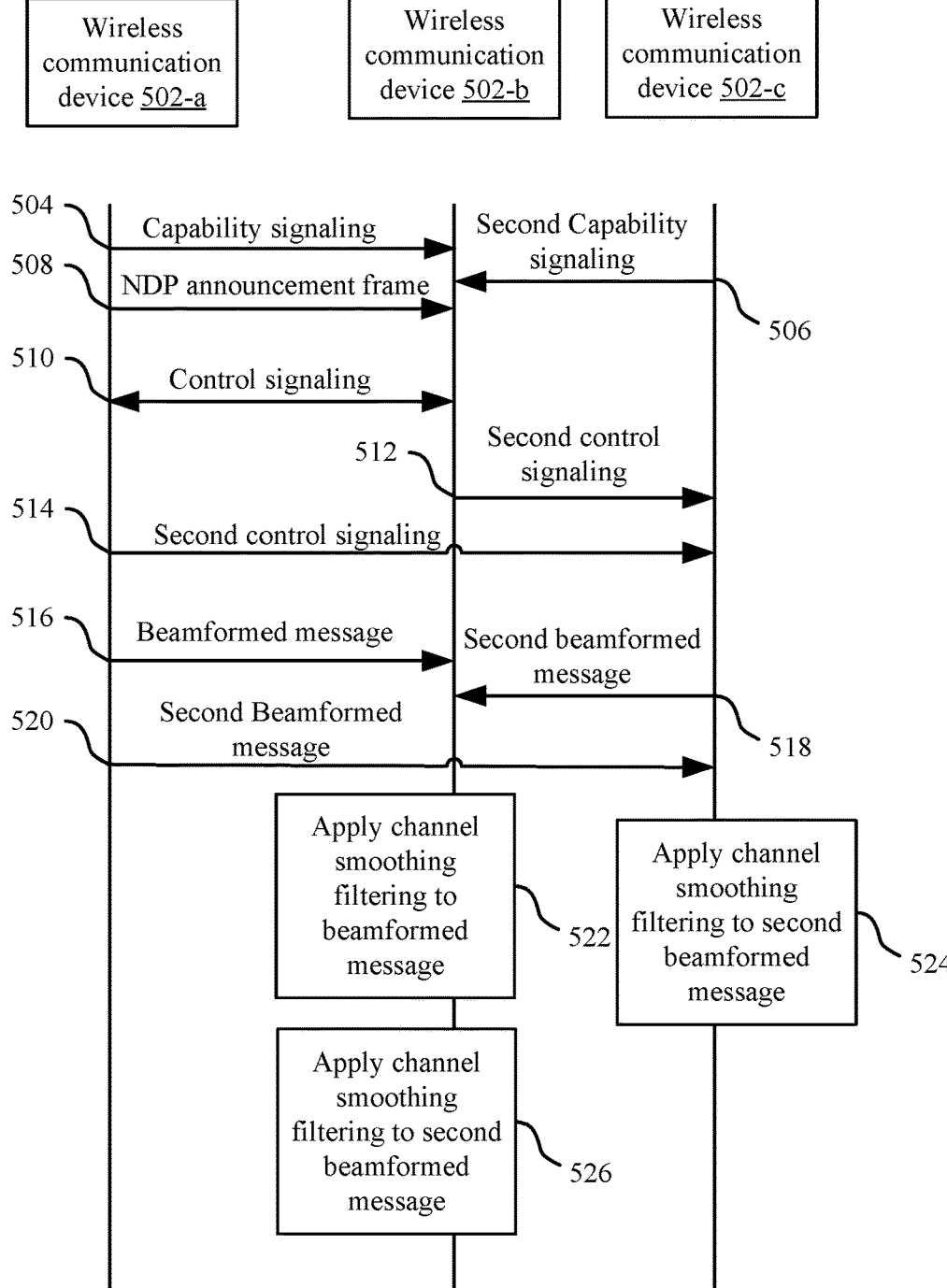
FIG. 5 shows an example of a process flow that supports coordination for smooth beamforming.

FIG. 5 shows an example of a process flow 500 that supports coordination for smooth beamforming. The process flow 500 may include a wireless communication device 502-a, a wireless communication device 502-b, and a wireless communication device 502-c, which may be examples of wireless communication devices 402 as described herein. In the following description of the process flow 500, the operations between the wireless communication device 502-a, the wireless communication device 502-b, and the wireless communication device 502-c may be transmitted in a different order than the example order shown, or the operations performed by the wireless communication device 502-a, the wireless communication device 502-b, and the wireless communication device 502-c may be performed in different orders or at different times. Some operations also may be omitted from the process flow 500, and other operations may be added to the process flow 500.

At 510, the wireless communication device 502-a (for example, the transmitting device or the beamformer) may communicate, with the wireless communication device 502-b (for example, the receiving device or the beamformee), control signaling that indicates that the wireless communication device 502-a is scheduled to transmit a beamformed message to the wireless communication device 502-b. The control signaling may include an indication that the wireless communication device 502-b is to apply channel smoothing filtering to the beamformed message.

At 516, the wireless communication device 502-a may transmit, to the wireless communication device 502-b, the beamformed message via a set of frequency tones. The beamformed message may satisfy a delay spread threshold, and/or a phase alignment of the beamformed message associated with the set of frequency tones may satisfy a phase alignment threshold. For example, the delay spread of the beamformed message may be roughly matching an open loop channel.

At 522, the wireless communication device 502-b may apply, in association with the control signaling, channel smoothing filtering to the beamformed message.

In some examples, communicating the control signaling at 510 involves the wireless communication device 502-a transmitting a control message to the wireless communication device 502-b that includes a first field that indicates that the wireless communication device 502-a is scheduled to transmit the beamformed message and a second field that includes the indication that the wireless communication device 502-b is to apply channel smoothing filtering to the beamformed message. For example, the control signaling may be included in a PPDU 350 (for example, a MU PPDU) as described with reference to FIG. 3. For example, the first field and the second field may be bits within a signal field (for example, the U-SIG 366 or the UHR signal field in 802.11bn).

In some examples, the control signaling at 510 may indicate for the wireless communication device 502-b to apply a level of channel smoothing filtering that is associated with at least one of the phase alignment threshold or the delay spread threshold. For example, more aggressive or less aggressive channel smoothing filtering may be indicated to be applied by the wireless communication device 502-*b* based on the phase alignment threshold and/or the delay spread threshold.

In some examples, devices that operate within a certain standard (for example, 802.11bn) may be required to satisfy a delay spread threshold and/or a phase alignment threshold for beamformed messages. For example, the control signaling at 510 may include an indication of a device type of the wireless communication device 502-*a* (for example, an indication that the wireless communication device 502-*a* complies with a standard that requires satisfaction of a delay spread threshold and/or a phase alignment threshold for beamformed messages). In such examples, the indication of the device type may indicate for the wireless communication device 502-*b* to apply channel smoothing filtering to beamformed messages received from the wireless communication device 502-*a*.

In some examples, the control signaling at 510 may involve a capability exchange. For example, such capability exchange may be bidirectional between the wireless communication device 502-*a* and the wireless communication device 502-*b*. Such capability exchanges may be used for uplink or downlink communications. For example, the communication of the control signaling may involve transmission by the wireless communication device 502-*a* of a first control message that indicates that the wireless communication device 502-*a* is scheduled to transmit the beamformed message to the wireless communication device 502-*b*. For example, the first control message may indicate to the receiving device (for example, the wireless communication device 502-*b*) that the transmitting device (for example, the wireless communication device 502-*a*) is applying smooth beamforming. The communication of the control signaling may further involve transmission by the wireless communication device 502-*b* of a second control message that indicates a feedback type and a receiver type of the wireless communication device 502-*b*. For example, second control message may indicate what type of channel estimation feedback approximation to SVD the receiving device will provide and/or what type of equalizer and decoder that the receiving device utilizes for decoding steered packets. The communication of the control signaling may further involve transmission by the wireless communication device 502-*a* and in response to the second control message, of a third control message that includes the indication that the wireless communication device 502-*b* is to apply channel smoothing filtering to the beamformed message. In some examples, communication of the control signaling may involve communication of semi-static channel characteristic information from the wireless communication device 502-*b* to the wireless communication device 502-*a*. In some examples, the first, second, and third control messages may be vendor specific frames (for example, based on the vendors of the wireless communication device 502-*a* and the wireless communication device 502-*b*). Such capability exchanges may be used for uplink transmissions (for example, for uplink MU-MIMO), for downlink MU-MIMO, for downlink CoBF, for uplink CoBF, for SU transmit beamforming in downlink, or for SU transmit beamforming in uplink.

A vendor specific action frame may include multiple octets. For example, a first octet may indicate a category (for example, may indicate the type of vendor specific action frame). One or more second octets may be used to indicate the vendor/organization. One or more third octets may indicate the vendor specific content (for example, the data in the first, second, and third control messages). In some examples, vendor specific action frames may be exchanged statically or semi-statically on a large time scale basis. A device that receives a vendor specific action frame may save (for example, latch) the identification fields for the received vendor specific action frame. For example, for a vendor specific action frame received from an AP 102, a STA 104 may save the BSS color of the sending AP 102. As another example, for a vendor specific action frame received from a STA 104, the AP 102 may save the transmit address (TA) of the sending STA 104 and may map that TA to a STA ID. In some examples, the receiving device (for example, the wireless communication device 502-*b*) may maintain a PHY messaging or programming that identifies packets are from the transmitting device (for example, the wireless communication device 502-*a*) for which to apply channel smoothing filtering. In such examples, the receiving device which receives an indication that the transmitting device is applying smooth beamforming may communicate the BSS color or STA ID to the PHY messaging or programming (for example, through a register).

In some examples, the beamformed message at 516 may be transmitted as an uplink MU MIMO transmission. For example, the wireless communication device 502-*a* may be a STA 104, the wireless communication device 502-*b* may be an AP 102, and the wireless communication device 502-*c* may be a STA. Uplink MU MIMO packets may be triggered by the AP 102 that will receive the packets (for example, the wireless communication device 502-*b*). For example, the wireless communication device 502-*b* may transmit the control signaling at 510 to the wireless communication device 502-*a*, and the wireless communication device 502-*b* may transmit second control signaling at 512 to the wireless communication device 502-*c*, where the second control signaling schedules the wireless communication device 502-*c* to transmit a second beamformed message, where the second control signaling includes a second indication that the wireless communication device 502-*b* is to apply channel smoothing filtering to the second beamformed message. In such examples, the wireless communication device 502-*c* may transmit a second beamformed message at 518 to the wireless communication device 502-*b* via a second set of frequency tones. The second beamformed message at 518 may at least partially overlap in time with the beamformed message at 516. The second beamformed message may satisfy the delay spread threshold, and/or a second phase alignment of the second beamformed message associated with the second set of frequency tones may satisfy the phase alignment threshold. At 526, the wireless communication device 502-*b* may apply channel smoothing filtering to the second beamformed message.

In uplink MU MIMO scenarios, the AP 102 (for example, the wireless communication device 502-*b*) may receive capability signaling from the STAs 104 (for example, the wireless communication device 502-*a* and the wireless communication device 502-*c*) indicating that the STAs 104 are capable of or will perform smooth beamforming (for example, will satisfy the delay spread threshold and/or the phase alignment threshold). For example, at 504, the wireless communication device 502-*a* may transmit capability signaling to the wireless communication device 502-*b* indicating the capability of the wireless communication device 502-*a* to transmit beamformed messages (for example, to apply smooth beamforming to transmission of messages). Similarly, at 506, the wireless communication device 502-*c* may transmit second capability signaling to the wireless communication device 502-*b* indicating the capability of the wireless communication device 502-*c* to transmit beamformed messages (for example, to apply smooth beamforming to transmission of messages). The wireless communication device 502-*b* may transmit the control signaling at 510 and the second control signaling at 512 based on the capability signaling at 504 and the second capability signaling at 506, respectively. In some examples, the wireless communication device 502-*b* in uplink MU MIMO may identify packets from the wireless communication device 502-*a* and the wireless communication device 502-*c* based on the STA IDs of the wireless communication device 502-*a* and the wireless communication device 502-*c* (for example, based on matching the TAs in vendor specific action frames received from the wireless communication device 502-*a* and the wireless communication device 502-*c* to STA IDs for the wireless communication device 502-*a* and the wireless communication device 502-*c*). In some examples, if each STA 104 (for example, the wireless communication device 502-*a*, the wireless communication device 502-*c*, and any other triggered STAs) in a triggered uplink MU MIMO packet with precoding indicated a capability to perform smooth beamforming, the receiving AP (for example, the wireless communication device 502-*b*) may apply channel smoothing filtering using open loop filters to harvest smoothing gain for the uplink MU MIMO packet.

In some examples, the beamformed message at 516 may be transmitted as a downlink packet. For example, the wireless communication device 502-*a* may be an AP 102 and the wireless communication device 502-*b* may be a STA 104. For example, the beamformed message at 516 may be a downlink SU beamformed transmission, a downlink OFDMA beamformed transmission, a downlink MU-MIMO beamformed transmission, or a downlink OFDMA MU-MIMO beamformed transmission. In such examples, the AP 102 may be associated with a BSS, and the control signaling at 510 may be transmitted by the wireless communication device 502-*a* and may indicate the BSS color of the BSS. In such examples, per-packet identification of APs that apply smooth beamforming may be based on the BSS color (for example, indicated in a vendor specific action frame). For example, the wireless communication device 502-*b* may identify that the beamformed message at 516 is from the wireless communication device 502-*a* based on an indication of the BSS color in the beamformed message. In some examples, as BSS color is not unique, BSS color ID may collide with an OBSS AP, and in such situations, a received packet may be ignored due to BSSID mismatch.

In some examples, the beamformed message at 516 may be a downlink MU transmission. For example, the wireless communication device 502-*a* may be an AP 102, and the wireless communication device 502-*b* and the wireless communication device 502-*c* may be STAs 104. The wireless communication device 502-*a* may transmit the control signaling at 510 to the wireless communication device 502-*b*. At 514, the wireless communication device 502-*a* may transmit, to the wireless communication device 502-*c*, second control signaling that indicates that the wireless communication device 502-*a* will transmit a second beamformed message to the wireless communication device 502-*c*. The second control signaling may include a second indication that the wireless communication device 502-*c* is to apply channel smoothing filtering to the second beamformed message. In such examples, at 520, the wireless communication device 502-*a* may transmit, to the wireless communication device 502-*c*, the second beamformed message via a second set of frequency tones, where the second beamformed message at least partially overlaps in time with the beamformed message. The second beamformed message may satisfy the delay spread threshold, and/or a second phase alignment of the second beamformed message associated with the second set of frequency tones may satisfy the phase alignment threshold. At 524, the wireless communication device 502-*c* may apply channel smoothing filtering to the second beamformed message.

In some examples, to satisfy the phase alignment threshold and/or the delay spread threshold, the wireless communication device 502-*a* may apply a smoothing filter across the set of frequency tones associated with the reconstructed channel matrix for the channel between the wireless communication device 502-*a* and the wireless communication device 502-*b* using feedback received from the wireless communication device 502-*a*. For example, the wireless communication device 502-*a* may transmit an NDP, and the wireless communication device 502-*b* may use the NDP to estimate the channel. The wireless communication device 502-*b* may transmit a report that includes a channel matrix indicative of the estimated channel between the wireless communication device 502-*a* and the wireless communication device 502-*b*. The wireless communication device 502-*a* may apply a smoothing filter across the set of frequency tones associated with the reconstructed channel matrix to reduce the phase misalignment and therefore reduce the delay spread, which may be referred to as V-smooth filtering.

For example, for downlink MU-MIMO, the wireless communication device 502-*a* (for example, an AP 102) may apply a first V-smooth filtering stage before the downlink MU precoder operating in the Ng (CBF) tone domain. The first V-smooth filtering stage may ensure that the downlink MU precoder may better perform precoder computation. The wireless communication device 502-*a* may apply a second V-smooth filtering stage after the downlink MU precoder (for example, operating in the 4×LTF tone domain). The transmitter (for example, the wireless communication device 502-*a*) may design different filters based on configuration parameters (for example, the MCS, the precoder method, the number of spatial streams, the number of transmitting antennas, or the number of downlink users). In some examples, the wireless communication device 502-*a* may update the V-smooth filtering coefficients based on the channel type or delay profiles, ensuring that the steered channel delay spread roughly matches the open loop channel without altering the computed downlink MU precoder weights. For example, more aggressive filtering may be applied to a lower delay profile. For example, a filter used in downlink MU-MIMO may be less aggressive as compared to a SU downlink beamforming case. In some examples, different or similar filter coefficients may be used before and after the downlink MU precoder. Filter coefficients may be optimized based on the downlink MU-MIMO precoder, but specified to follow a delay profile. In some examples, the specific downlink MU-MIMO beamformer design may be vendor implementation specific. The receiving devices (for example, the wireless communication device 502-*b* and the wireless communication device 502-*c*) may apply channel smoothing as long as the received channel satisfies the expected delay profile (for example, roughly matches the expected open loop delay spread).

In some examples, the beamformed message at 516 may be an uplink SU transmission. For example, the wireless communication device 502-*a* may be a STA 104 and the wireless communication device 502-*b* may be an AP 102. In some such examples, at 504, the wireless communication device 502-*a* may transmit capability signaling indicating a capability of the wireless communication device 502-*a* to transmit beamformed messages (for example, to perform smooth beamforming). In some examples, at 508, the wireless communication device 502-*a* may transmit an NDP announcement (NDPA) frame that indicates a TA corresponding to the wireless communication device 502-*a* and a receiver address (RA) corresponding to the wireless communication device 502-*b* for the beamformed message at 510. For example, the beamformed message may use SIFS steering which may include a sequence that involves transmission by the STA of an NDPA and a corresponding NDP. The wireless communication device 502-*b* may estimate the channel based on the NDP and may feed back a channel estimation matrix used for beamforming at the wireless communication device 502-*a*. The wireless communication device 502-*b* may identify, based on the TA in the NDPA, that the wireless communication device 502-*a* performs smooth beamforming, for example, if the wireless communication device 502-*a* already transmitted a vendor specific action frame indicating that the wireless communication device 502-*a* performs smooth beamforming.

As described herein, the wireless communication device 502-*b* may utilize a channel smoothing filter for beamformed message. The wireless communication device 502-*b* may identify to perform channel smoothing filtering for a beamformed message when control signaling (for example, a decoded bit in a signal field, a vendor specific action frame, or control signaling indicating the smooth beamforming capability of the wireless communication device 502-*a*) indicates for the wireless communication device 502-*b* to perform channel smoothing filtering for the beamformed message. The wireless communication device 502-*b* may select open loop filters in the case of steered packets. Such open loop filters may be aggressive, particularly for high data rates, which may accordingly harvest channel smoothing gains. The wireless communication device 502-*b* may apply a smoothing filter selection logic for a steered packet. The smoothing filter selection logic may have low susceptibility to error floors, even for high order quadrature amplitude modulation (QAM), for example, 4K-QAM. The smoothing filter selection logic may ensure unification across different steered packet types (for example, SU transmit beamforming, downlink MU, uplink MU-MIMO with precoding). The smoothing filter selection logic may ensure unification across different beamformee feedback types, such as V-precoding or any approximation to SVD or V-precoding.

Figure 6:
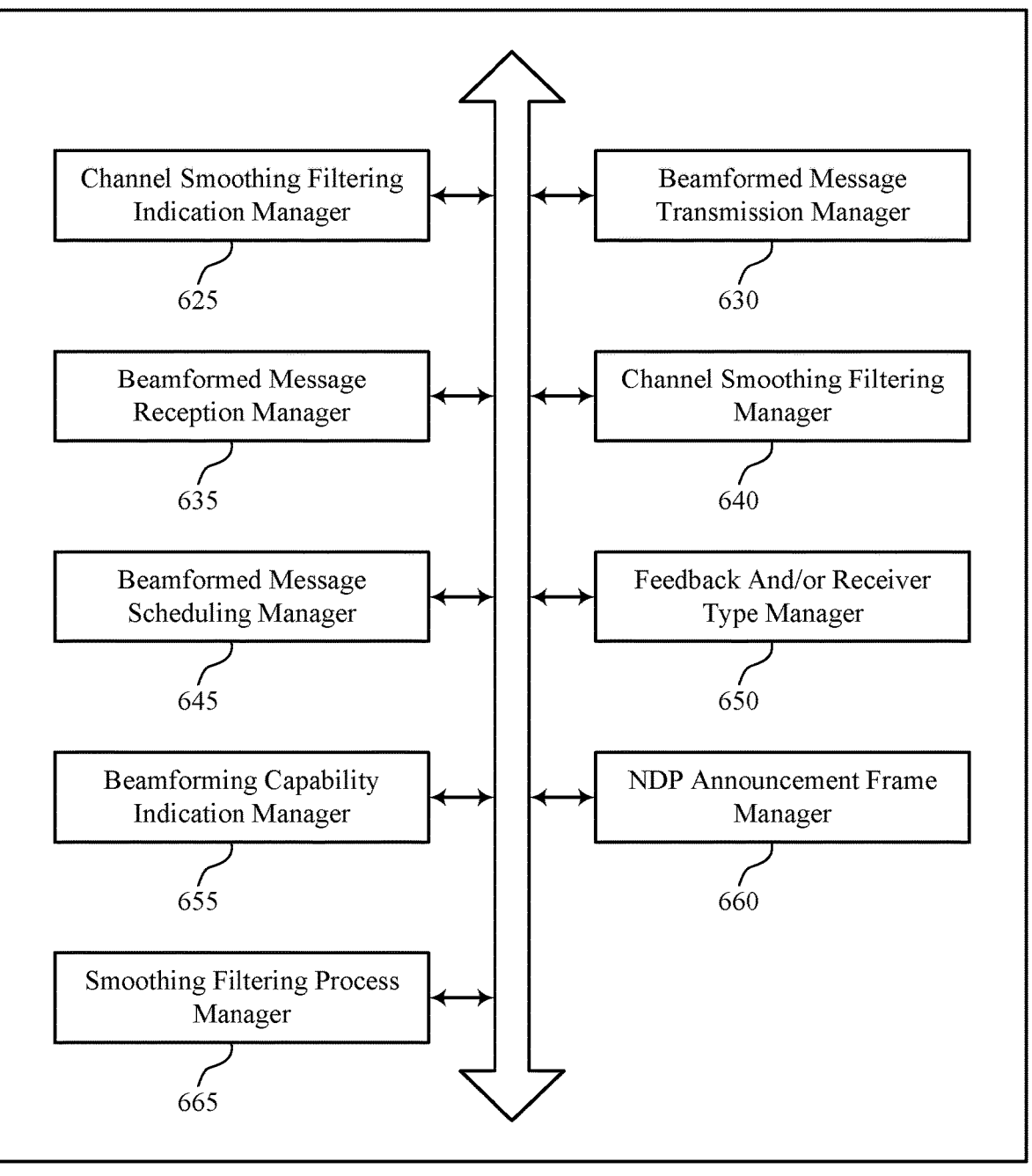
FIG. 6 shows a block diagram of an example wireless communication device that supports coordination for smooth beamforming.

FIG. 6 shows a block diagram of an example wireless communication device 600 that supports coordination for smooth beamforming. In some examples, the wireless communication device 600 is configured to perform the processes 700 and 800 described with reference to FIGS. 7 and 8, respectively. The wireless communication device 600 may include one or more chips, SoCs, chipsets, packages, components or devices that individually or collectively constitute or include a processing system. The processing system may interface with other components of the wireless communication device 600, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the wireless communication device 600 may transmit the information output from the chip. In such an example, the second interface may refer to an interface between the processing system of the chip and a reception component, such that the wireless communication device 600 may receive information that is then passed to the processing system. In some such examples, the first interface also may obtain information, such as from the transmission component, and the second interface also may output information, such as to the reception component.

The processing system of the wireless communication device 600 includes processor (or "processing") circuitry in the form of one or multiple processors, microprocessors, processing units (such as central processing units (CPUs), graphics processing units (GPUs), neural processing units (NPUs) (also referred to as neural network processors or deep learning processors (DLPs)), or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or ROM, or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally, or alternatively, in some examples, one or more of the processors may be preconfigured to perform various functions or operations described herein without requiring configuration by software. The processing system may further include or be coupled with one or more modems (such as a Wi-Fi (such as IEEE compliant) modem or a cellular (such as 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

In some examples, the wireless communication device 600 can be configurable or configured for use in an AP or STA, such as the AP 102 or the STA 104 described with reference to FIG. 1. In some other examples, the wireless communication device 600 can be an AP or STA that includes such a processing system and other components including multiple antennas. The wireless communication device 600 is capable of transmitting and receiving wireless communications in the form of, for example, wireless packets. For example, the wireless communication device 600 can be configurable or configured to transmit and receive packets in the form of physical layer PPDUs and MPDUs conforming to one or more of the IEEE 802.11 family of wireless communication protocol standards. In some other examples, the wireless communication device 600 can be configurable or configured to transmit and receive signals and communications conforming to one or more 3GPP specifications including those for 5G NR or 6G. In some examples, the wireless communication device 600 also includes or can be coupled with one or more application processors which may be further coupled with one or more other memories. In some examples, the wireless communication device 600 further includes a user interface (UI) (such as a touchscreen or keypad) and a display, which may be integrated with the UI to form a touchscreen display that is coupled with the processing system. In some examples, the wireless communication device 600 may further include one or more sensors such as, for example, one or more inertial sensors, accelerometers, temperature sensors, pressure sensors, or altitude sensors, that are coupled with the processing system. In some examples, the wireless communication device 600 further includes at least one external network interface coupled with the processing system that enables communication with a core network or backhaul network that enables the wireless communication device 600 to gain access to external networks including the Internet.

The wireless communication device 600 includes a channel smoothing filtering indication manager 625, a beamformed message transmission manager 630, a beamformed message reception manager 635, a channel smoothing filtering manager 640, a beamformed message scheduling manager 645, a feedback and/or receiver type manager 650, a beamforming capability indication manager 655, an NDP announcement frame manager 660, and a smoothing filtering process manager 665. Portions of one or more of the channel smoothing filtering indication manager 625, the beamformed message transmission manager 630, the beamformed message reception manager 635, the channel smoothing filtering manager 640, the beamformed message scheduling manager 645, the feedback and/or receiver type manager 650, the beamforming capability indication manager 655, the NDP announcement frame manager 660, and the smoothing filtering process manager 665 may be implemented at least in part in hardware or firmware. For example, one or more of the channel smoothing filtering indication manager 625, the beamformed message transmission manager 630, the beamformed message reception manager 635, the channel smoothing filtering manager 640, the beamformed message scheduling manager 645, the feedback and/or receiver type manager 650, the beamforming capability indication manager 655, the NDP announcement frame manager 660, and the smoothing filtering process manager 665 may be implemented at least in part by at least a processor or a modem. In some examples, portions of one or more of the channel smoothing filtering indication manager 625, the beamformed message transmission manager 630, the beamformed message reception manager 635, the channel smoothing filtering manager 640, the beamformed message scheduling manager 645, the feedback and/or receiver type manager 650, the beamforming capability indication manager 655, the NDP announcement frame manager 660, and the smoothing filtering process manager 665 may be implemented at least in part by a processor and software in the form of processor-executable code stored in memory.

The wireless communication device 600 may support wireless communications in accordance with examples as disclosed herein. The channel smoothing filtering indication manager 625 is configurable or configured to communicate, with a second wireless communication device, control signaling that indicates that the first wireless communication device is scheduled to transmit a beamformed message to the second wireless communication device, and where the control signaling includes an indication that the second wireless communication device is to apply channel smoothing filtering to the beamformed message. The beamformed message transmission manager 630 is configurable or configured to transmit, to the second wireless communication device and in association with the control signaling, the beamformed message via a set of frequency tones, where one or both of the beamformed message satisfies a delay spread threshold or a phase alignment of the beamformed message associated with the set of frequency tones satisfies a phase alignment threshold.

In some examples, to support communicating the control signaling, the channel smoothing filtering indication manager 625 is configurable or configured to transmit a control message that includes a first field that indicates that the first wireless communication device is scheduled to transmit the beamformed message, where the control message includes a second field that includes the indication that the second wireless communication device is to apply channel smoothing filtering to the beamformed message.

In some examples, the control signaling indicates to apply a level of channel smoothing filtering that is associated with at least one of the phase alignment threshold or the delay spread threshold.

In some examples, the control signaling includes an indication of a device type of the first wireless communication device. In some examples, the indication of the device type indicates that the first wireless communication device is scheduled to transmit the beamformed message. In some examples, the indication of the device type is the indication that the second wireless communication device is to apply channel smoothing filtering to the beamformed message.

In some examples, to support communicating the control signaling, the beamformed message scheduling manager 645 is configurable or configured to transmit a first control message that indicates that the first wireless communication device is scheduled to transmit the beamformed message to the second wireless communication device. In some examples, to support communicating the control signaling, the feedback and/or receiver type manager 650 is configurable or configured to receive a second control message that indicates a feedback type and receiver type of the second wireless communication device. In some examples, to support communicating the control signaling, the channel smoothing filtering indication manager 625 is configurable or configured to transmit, in response to the second control message, a third control message that includes the indication that the second wireless communication device is to apply channel smoothing filtering to the beamformed message.

In some examples, the first control message is a first vendor specific frame, the second control message is a second vendor specific frame, and the third control message is a third vendor specific frame.

In some examples, the beamforming capability indication manager 655 is configurable or configured to transmit, to the second wireless communication device, capability signaling indicating a capability of the first wireless communication device to transmit beamformed messages, where the first wireless communication device is a STA, where the second wireless communication device is an AP, where the control signaling is received from the second wireless communication device, and where the control signaling schedules the first wireless communication device to transmit the beamformed message.

In some examples, the first wireless communication device is an AP associated with a basic service set identifier. In some examples, the second wireless communication device is a STA. In some examples, the control signaling is transmitted by the first wireless communication device. In some examples, the control signaling indicates the basic service set identifier.

In some examples, the channel smoothing filtering indication manager 625 is configurable or configured to transmit, to a third wireless communication device, second control signaling that indicates that the first wireless communication device will transmit a second beamformed message to the third wireless communication device, where the second control signaling includes a second indication that the third wireless communication device is to apply channel smoothing filtering to the second beamformed message, and where the third wireless communication device is a second STA. In some examples, the beamformed message transmission manager 630 is configurable or configured to transmit, to the third wireless communication device and in association with the second control signaling, the second beamformed message via a second set of frequency tones, where the second beamformed message at least partially overlaps in time with the beamformed message, where one or both of the second beamformed message satisfies the delay spread threshold or a second phase alignment of the second beamformed message associated with the second set of frequency tones satisfies the phase alignment threshold.

In some examples, to support communicating the control signaling, the beamforming capability indication manager 655 is configurable or configured to transmit, to the second wireless communication device, capability signaling indicating a capability of the first wireless communication device to transmit beamformed messages, where the first wireless communication device is a STA, and where the second wireless communication device is an AP. In some examples, to support communicating the control signaling, the NDP announcement frame manager 660 is configurable or configured to transmit, to the second wireless communication device, an NDPA frame that indicates a TA corresponding to the first wireless communication device and a receiver address corresponding to the second wireless communication device for the beamformed message.

In some examples, the smoothing filtering process manager 665 is configurable or configured to apply a first v-smooth filtering process in a first tone domain to a packet mapped to the set of frequency tones. In some examples, the smoothing filtering process manager 665 is configurable or configured to apply a second v-smooth filtering process to the packet in a second tone domain subsequent to applying the first v-smooth filtering process, where satisfaction of the delay spread threshold is based on application of at least one of the first v-smooth filtering process or the second v-smooth filtering process.

In some examples, the indication in the control signaling is associated with an expectation that the beamformed message will satisfy at least one of the delay spread threshold or the phase alignment threshold.

In some examples, the delay spread threshold is less than −X dBc power outside of a Y nanosecond time interval.

Additionally, or alternatively, the wireless communication device 600 may support wireless communications in accordance with examples as disclosed herein. In some examples, the channel smoothing filtering indication manager 625 is configurable or configured to communicate, with a first wireless communication device, control signaling that indicates that the first wireless communication device is scheduled to transmit a beamformed message to the second wireless communication device, and where the control signaling includes an indication that the second wireless communication device is to apply channel smoothing filtering to the beamformed message. The beamformed message reception manager 635 is configurable or configured to receive, from the first wireless communication device, the beamformed message via a set of frequency tones, where one or both of the beamformed message satisfies a delay spread threshold or a phase alignment of the beamformed message associated with the set of frequency tones satisfies a phase alignment threshold. The channel smoothing filtering manager 640 is configurable or configured to apply, in association with the control signaling, channel smoothing filtering to the beamformed message.

In some examples, to support communicating the control signaling, the channel smoothing filtering indication manager 625 is configurable or configured to receive a control message that includes a first field that indicates that the first wireless communication device is scheduled to transmit the beamformed message, where the control message includes a second field that includes the indication that the second wireless communication device is to apply channel smoothing filtering to the beamformed message.

In some examples, the control signaling indicates to apply a level of channel smoothing filtering that is associated with at least one of the phase alignment threshold or the delay spread threshold.

In some examples, the control signaling includes an indication of a device type of the first wireless communication device. In some examples, the indication of the device type indicates that the first wireless communication device is scheduled to transmit the beamformed message. In some examples, the indication of the device type is the indication that the second wireless communication device is to apply channel smoothing filtering to the beamformed message.

In some examples, to support communicating the control signaling, the beamformed message scheduling manager 645 is configurable or configured to receive a first control message that indicates that the first wireless communication device is scheduled to transmit the beamformed message to the second wireless communication device. In some examples, to support communicating the control signaling, the feedback and/or receiver type manager 650 is configurable or configured to transmit a second control message that indicates a feedback type and receiver type of the second wireless communication device. In some examples, to support communicating the control signaling, the channel smoothing filtering indication manager 625 is configurable or configured to receive, in response to the second control message, a third control message that includes the indication that the second wireless communication device is to apply channel smoothing filtering to the beamformed message.

In some examples, the first control message is a first vendor specific frame, the second control message is a second vendor specific frame, and the third control message is a third vendor specific frame.

In some examples, the beamforming capability indication manager 655 is configurable or configured to receive, from the first wireless communication device, capability signaling indicating a capability of the first wireless communication device to transmit beamformed messages, where the first wireless communication device is a STA, where the second wireless communication device is an AP, where the control signaling is transmitted to the first wireless communication device, and where the control signaling schedules the first wireless communication device to transmit the beamformed message.

In some examples, the beamforming capability indication manager 655 is configurable or configured to receive, from a third wireless communication device, second capability signaling indicating a second capability of the third wireless communication device to transmit beamformed messages, where the third wireless communication device is a second STA. In some examples, the beamformed message scheduling manager 645 is configurable or configured to transmit, to the third wireless communication device, second control signaling that schedules the third wireless communication device to transmit a second beamformed message, where the second control signaling includes a second indication that the second wireless communication device is to apply channel smoothing filtering to the second beamformed message. In some examples, the beamformed message reception manager 635 is configurable or configured to receive, from the third wireless communication device and in association with the second control signaling, the second beamformed message via a second set of frequency tones, where the second beamformed message at least partially overlaps in time with the beamformed message, where one or both of the second beamformed message satisfies the delay spread threshold or a second phase alignment of the second beamformed message associated with the second set of frequency tones satisfies the phase alignment threshold. In some examples, the channel smoothing filtering manager 640 is configurable or configured to apply, in association with the second control signaling, channel smoothing filtering to the second beamformed message.

In some examples, the first wireless communication device is an AP associated with a basic service set identifier. In some examples, the second wireless communication device is a STA. In some examples, the control signaling is received by the second wireless communication device. In some examples, the control signaling indicates the basic service set identifier.

In some examples, to support communicating the control signaling, the beamforming capability indication manager 655 is configurable or configured to receive, from the first wireless communication device, capability signaling indicating a capability of the first wireless communication device to transmit beamformed messages, where the first wireless communication device is a STA, and where the second wireless communication device is an AP. In some examples, to support communicating the control signaling, the NDP announcement frame manager 660 is configurable or configured to receive, from the first wireless communication device, a NDPA frame that indicates a TA corresponding to the first wireless communication device and a receiver address corresponding to the second wireless communication device for the beamformed message.

In some examples, applying the channel smoothing filtering to the beamformed message includes applying one or more open loop filters to the beamformed message.

In some examples, the indication in the control signaling is associated with an expectation that the beamformed message will satisfy at least one of the delay spread threshold or the phase alignment threshold.

In some examples, the delay spread threshold is less than −X dBc power outside of a Y nanosecond time interval.

FIG. 7 shows a flowchart illustrating an example process 700 performable by or at a first wireless communication device that supports coordination for smooth beamforming.

The operations of the process 700 may be implemented by a first wireless communication device or its components as described herein. For example, the process 700 may be performed by a wireless communication device, such as the wireless communication device 600 described with reference to FIG. 6, operating as or within a wireless AP or a wireless STA. In some examples, the process 700 may be performed by a wireless AP or a wireless STA, such as one of the APs 102 or the STAs 104 described with reference to FIG. 1.

In some examples, in 705, the first wireless communication device may communicate, with a second wireless communication device, control signaling that indicates that the first wireless communication device is scheduled to transmit a beamformed message to the second wireless communication device, and where the control signaling includes an indication that the second wireless communication device is to apply channel smoothing filtering to the beamformed message. The operations of 705 may be performed in accordance with examples as disclosed herein. In some implementations, aspects of the operations of 705 may be performed by a channel smoothing filtering indication manager 625 as described with reference to FIG. 6.

In some examples, in 710, the first wireless communication device may transmit, to the second wireless communication device and in association with the control signaling, the beamformed message via a set of frequency tones, where one or both of the beamformed message satisfies a delay spread threshold or a phase alignment of the beamformed message associated with the set of frequency tones satisfies a phase alignment threshold. The operations of 710 may be performed in accordance with examples as disclosed herein. In some implementations, aspects of the operations of 710 may be performed by a beamformed message transmission manager 630 as described with reference to FIG. 6.

FIG. 8 shows a flowchart illustrating an example process 800 performable by or at a second wireless communication device that supports coordination for smooth beamforming. The operations of the process 800 may be implemented by a second wireless communication device or its components as described herein. For example, the process 800 may be performed by a wireless communication device, such as the wireless communication device 600 described with reference to FIG. 6, operating as or within a wireless AP or a wireless STA. In some examples, the process 800 may be performed by a wireless AP or a wireless STA, such as one of the APs 102 or the STAs 104 described with reference to FIG. 1.

In some examples, in 805, the second wireless communication device may communicate, with a first wireless communication device, control signaling that indicates that the first wireless communication device is scheduled to transmit a beamformed message to the second wireless communication device, and where the control signaling includes an indication that the second wireless communication device is to apply channel smoothing filtering to the beamformed message. The operations of 805 may be performed in accordance with examples as disclosed herein. In some implementations, aspects of the operations of 805 may be performed by a channel smoothing filtering indication manager 625 as described with reference to FIG. 6.

In some examples, in 810, the second wireless communication device may receive, from the first wireless communication device, the beamformed message via a set of frequency tones, where one or both of the beamformed message satisfies a delay spread threshold or a phase alignment of the beamformed message associated with the set of frequency tones satisfies a phase alignment threshold. The operations of 810 may be performed in accordance with examples as disclosed herein. In some implementations, aspects of the operations of 810 may be performed by a beamformed message reception manager 635 as described with reference to FIG. 6.

In some examples, in 815, the second wireless communication device may apply, in association with the control signaling, channel smoothing filtering to the beamformed message. The operations of 815 may be performed in accordance with examples as disclosed herein. In some implementations, aspects of the operations of 815 may be performed by a channel smoothing filtering manager 640 as described with reference to FIG. 6.

Implementation examples are described in the following numbered clauses:

The following provides an overview of aspects of the present disclosure:

Aspect 1: A method for wireless communications at a first wireless communication device, including: communicating, with a second wireless communication device, control signaling that indicates that the first wireless communication device is scheduled to transmit a beamformed message to the second wireless communication device, and where the control signaling includes an indication that the second wireless communication device is to apply channel smoothing filtering to the beamformed message; and transmitting, to the second wireless communication device and in association with the control signaling, the beamformed message via a set of frequency tones, where one or both of the beamformed message satisfies a delay spread threshold or a phase alignment of the beamformed message associated with the set of frequency tones satisfies a phase alignment threshold.

Aspect 2: The method of aspect 1, where communicating the control signaling includes: transmitting a control message that includes a first field that indicates that the first wireless communication device is scheduled to transmit the beamformed message, where the control message includes a second field that includes the indication that the second wireless communication device is to apply channel smoothing filtering to the beamformed message.

Aspect 3: The method of any of aspects 1-2, where the control signaling indicates to apply a level of channel smoothing filtering that is associated with at least one of the phase alignment threshold or the delay spread threshold.

Aspect 4: The method of aspect 1, where the control signaling includes an indication of a device type of the first wireless communication device, the indication of the device type indicates that the first wireless communication device is scheduled to transmit the beamformed message, and the indication of the device type is the indication that the second wireless communication device is to apply channel smoothing filtering to the beamformed message.

Aspect 5: The method of aspect 1, where communicating the control signaling includes: transmitting a first control message that indicates that the first wireless communication device is scheduled to transmit the beamformed message to the second wireless communication device; receiving a second control message that indicates a feedback type and receiver type of the second wireless communication device; and transmitting, in response to the second control message, a third control message that includes the indication that the second wireless communication device is to apply channel smoothing filtering to the beamformed message.

Aspect 6: The method of aspect 5, where the first control message is a first vendor specific frame, the second control message is a second vendor specific frame, and the third control message is a third vendor specific frame.

Aspect 7: The method of any of aspects 1-6, further including: transmitting, to the second wireless communication device, capability signaling indicating a capability of the first wireless communication device to transmit beamformed messages, where the first wireless communication device is a STA, where the second wireless communication device is an AP, where the control signaling is received from the second wireless communication device, and where the control signaling schedules the first wireless communication device to transmit the beamformed message.

Aspect 8: The method of any of aspects 1-7, where the first wireless communication device is an AP associated with a BSS identifier, the second wireless communication device is a STA, the control signaling is transmitted by the first wireless communication device, and the control signaling indicates the BSS identifier.

Aspect 9: The method of aspect 8, further including: transmitting, to a third wireless communication device, second control signaling that indicates that the first wireless communication device will transmit a second beamformed message to the third wireless communication device, where the second control signaling includes a second indication that the third wireless communication device is to apply channel smoothing filtering to the second beamformed message, and where the third wireless communication device is a second STA; and transmitting, to the third wireless communication device and in association with the second control signaling, the second beamformed message via a second set of frequency tones, where the second beamformed message at least partially overlaps in time with the beamformed message, where one or both of the second beamformed message satisfies the delay spread threshold or a second phase alignment of the second beamformed message associated with the second set of frequency tones satisfies the phase alignment threshold.

Aspect 10: The method of any of aspects 1-9, where communicating the control signaling includes: transmitting, to the second wireless communication device, capability signaling indicating a capability of the first wireless communication device to transmit beamformed messages, where the first wireless communication device is a STA, and where the second wireless communication device is an AP; and transmitting, to the second wireless communication device, an NDPA frame that indicates a TA corresponding to the first wireless communication device and an RA corresponding to the second wireless communication device for the beamformed message.

Aspect 11: The method of any of aspects 1-10, further including at least one of: applying a first v-smooth filtering process in a first tone domain to a packet mapped to the set of frequency tones; or applying a second v-smooth filtering process to the packet in a second tone domain subsequent to applying the first v-smooth filtering process, where satisfaction of the delay spread threshold is based at least in part on application of at least one of the first v-smooth filtering process or the second v-smooth filtering process.

Aspect 12: The method of any of aspects 1-11, where the indication in the control signaling is associated with an expectation that the beamformed message will satisfy at least one of the delay spread threshold or the phase alignment threshold.

Aspect 13: The method of any of aspects 1-12, where the delay spread threshold is less than −X dBc power outside of a Y nanosecond time interval.

Aspect 14: A method for wireless communications at a second wireless communication device, including: communicating, with a first wireless communication device, control signaling that indicates that the first wireless communication device is scheduled to transmit a beamformed message to the second wireless communication device, and where the control signaling includes an indication that the second wireless communication device is to apply channel smoothing filtering to the beamformed message; receiving, from the first wireless communication device, the beamformed message via a set of frequency tones, where one or both of the beamformed message satisfies a delay spread threshold or a phase alignment of the beamformed message associated with the set of frequency tones satisfies a phase alignment threshold; and applying, in association with the control signaling, channel smoothing filtering to the beamformed message.

Aspect 15: The method of aspect 14, where communicating the control signaling includes: receiving a control message that includes a first field that indicates that the first wireless communication device is scheduled to transmit the beamformed message, where the control message includes a second field that includes the indication that the second wireless communication device is to apply channel smoothing filtering to the beamformed message.

Aspect 16: The method of any of aspects 14-15, where the control signaling indicates to apply a level of channel smoothing filtering that is associated with at least one of the phase alignment threshold or the delay spread threshold.

Aspect 17: The method of aspect 14, where the control signaling includes an indication of a device type of the first wireless communication device, the indication of the device type indicates that the first wireless communication device is scheduled to transmit the beamformed message, and the indication of the device type is the indication that the second wireless communication device is to apply channel smoothing filtering to the beamformed message.

Aspect 18: The method of aspect 14, where communicating the control signaling includes: receiving a first control message that indicates that the first wireless communication device is scheduled to transmit the beamformed message to the second wireless communication device; transmitting a second control message that indicates a feedback type and receiver type of the second wireless communication device; and receiving, in response to the second control message, a third control message that includes the indication that the second wireless communication device is to apply channel smoothing filtering to the beamformed message.

Aspect 19: The method of aspect 18, where the first control message is a first vendor specific frame, the second control message is a second vendor specific frame, and the third control message is a third vendor specific frame.

Aspect 20: The method of any of aspects 14-19, further including: receiving, from the first wireless communication device, capability signaling indicating a capability of the first wireless communication device to transmit beamformed messages, where the first wireless communication device is a STA, where the second wireless communication device is an AP, where the control signaling is transmitted to the first wireless communication device, and where the control signaling schedules the first wireless communication device to transmit the beamformed message.

Aspect 21: The method of aspect 20, further including: receiving, from a third wireless communication device, second capability signaling indicating a second capability of the third wireless communication device to transmit beamformed messages, where the third wireless communication device is a second STA; transmitting, to the third wireless communication device, second control signaling that schedules the third wireless communication device to transmit a second beamformed message, where the second control signaling includes a second indication that the second wireless communication device is to apply channel smoothing filtering to the second beamformed message; receiving, from the third wireless communication device and in association with the second control signaling, the second beamformed message via a second set of frequency tones, where the second beamformed message at least partially overlaps in time with the beamformed message, where one or both of the second beamformed message satisfies the delay spread threshold or a second phase alignment of the second beamformed message associated with the second set of frequency tones satisfies the phase alignment threshold; and applying, in association with the second control signaling, channel smoothing filtering to the second beamformed message.

Aspect 22: The method of any of aspects 14-21, where the first wireless communication device is an AP associated with a BSS identifier, the second wireless communication device is a STA, the control signaling is received by the second wireless communication device, and the control signaling indicates the BSS identifier.

Aspect 23: The method of any of aspects 14-22, where communicating the control signaling includes: receiving, from the first wireless communication device, capability signaling indicating a capability of the first wireless communication device to transmit beamformed messages, where the first wireless communication device is a STA, and where the second wireless communication device is an AP; and receiving, from the first wireless communication device, an NDPA frame that indicates a TA corresponding to the first wireless communication device and an RA corresponding to the second wireless communication device for the beamformed message.

Aspect 24: The method of any of aspects 14-23, where applying the channel smoothing filtering to the beamformed message includes applying one or more open loop filters to the beamformed message.

Aspect 25: The method of any of aspects 14-24, where the indication in the control signaling is associated with an expectation that the beamformed message will satisfy at least one of the delay spread threshold or the phase alignment threshold.

Aspect 26: The method of any of aspects 14-25, where the delay spread threshold is less than $-X$ dBc power outside of a Y nanosecond time interval.

Aspect 27: A first wireless communication device for wireless communications, including one or more memories storing processor-executable code, and one or more processors coupled with the one or more memories and individually or collectively operable to execute the code to cause the first wireless communication device to perform a method of any of aspects 1-13.

Aspect 28: A first wireless communication device for wireless communications, including at least one means for performing a method of any of aspects 1-13.

Aspect 29: A non-transitory computer-readable medium storing code for wireless communications, the code including instructions executable by one or more processors to perform a method of any of aspects 1-13.

Aspect 30: A second wireless communication device for wireless communications, including one or more memories storing processor-executable code, and one or more processors coupled with the one or more memories and individually or collectively operable to execute the code to cause the second wireless communication device to perform a method of any of aspects 14-26.

Aspect 31: A second wireless communication device for wireless communications, including at least one means for performing a method of any of aspects 14-26.

Aspect 32: A non-transitory computer-readable medium storing code for wireless communications, the code including instructions executable by one or more processors to perform a method of any of aspects 14-26.

As used herein, the term "determine" or "determining" encompasses a wide variety of actions and, therefore, "determining" can include calculating, computing, processing, deriving, estimating, investigating, looking up (such as via looking up in a table, a database, or another data structure), inferring, ascertaining, or measuring, among other possibilities. Also, "determining" can include receiving (such as receiving information), accessing (such as accessing data stored in memory) or transmitting (such as transmitting information), among other possibilities. Additionally, "determining" can include resolving, selecting, obtaining, choosing, establishing and other such similar actions.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b. Furthermore, as used herein, a phrase referring to "a" or "an" element refers to one or more of such elements acting individually or collectively to perform the recited function(s). Additionally, a "set" refers to one or more items, and a "subset" refers to less than a whole set, but non-empty.

As used herein, "based on" is intended to be interpreted in the inclusive sense, unless otherwise explicitly indicated. For example, "based on" may be used interchangeably with "based at least in part on," "associated with," "in association with," or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

The various illustrative components, logic, logical blocks, modules, circuits, operations, and algorithm processes described in connection with the examples disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A first wireless communication device, comprising:

a processing system that includes processor circuitry and memory circuitry that stores code, the processing system configured to cause the first wireless communication device to:

communicate, with a second wireless communication device, control signaling that indicates that the first wireless communication device is scheduled to transmit a beamformed message to the second wireless communication device, and wherein the control signaling includes an indication that the second wireless communication device is to apply channel smoothing filtering to the beamformed message;

transmit, to the second wireless communication device and in association with the control signaling, the beamformed message via a set of frequency tones, wherein one or both of the beamformed message satisfies a delay spread threshold or a phase alignment of the beamformed message associated with the set of frequency tones satisfies a phase alignment threshold; and apply a first v-smooth filtering process in a first tone domain to a packet mapped to the set of frequency tones; or apply the first v-smooth filtering process in the first tone domain to the packet and apply a second v-smooth filtering process to the packet in a second tone domain subsequent to applying the first v-smooth filtering process, wherein satisfaction of the delay spread threshold is based at least in part on application of at least one of the first v-smooth filtering process or the second v-smooth filtering process.

2. The first wireless communication device of claim 1, wherein, to communicate the control signaling, the processing system is configured to cause the first wireless communication device to:

transmit a control message that includes a first field that indicates that the first wireless communication device is scheduled to transmit the beamformed message, wherein the control message includes a second field that includes the indication that the second wireless communication device is to apply channel smoothing filtering to the beamformed message.

3. The first wireless communication device of claim 1, wherein the control signaling indicates to apply a level of channel smoothing filtering that is associated with at least one of the phase alignment threshold or the delay spread threshold.

4. The first wireless communication device of claim 1, wherein:

the control signaling comprises an indication of a device type of the first wireless communication device, the indication of the device type indicates that the first wireless communication device is scheduled to transmit the beamformed message, and the indication of the device type is the indication that the second wireless communication device is to apply channel smoothing filtering to the beamformed message.

5. The first wireless communication device of claim 1, wherein, to communicate the control signaling, the processing system is configured to cause the first wireless communication device to:

transmit a first control message that indicates that the first wireless communication device is scheduled to transmit the beamformed message to the second wireless communication device;

receive a second control message that indicates a feedback type and receiver type of the second wireless communication device; and transmit, in response to the second control message, a third control message that includes the indication that the second wireless communication device is to apply channel smoothing filtering to the beamformed message.

6. The first wireless communication device of claim 5, wherein the first control message is a first vendor specific frame, the second control message is a second vendor specific frame, and the third control message is a third vendor specific frame.

7. The first wireless communication device of claim 1, wherein the processing system is further configured to cause the first wireless communication device to:

transmit, to the second wireless communication device, capability signaling indicating a capability of the first wireless communication device to transmit beamformed messages, wherein the first wireless communication device is a station, wherein the second wireless communication device is an access point, wherein the control signaling is received from the second wireless communication device, and wherein the control signaling schedules the first wireless communication device to transmit the beamformed message.

8. The first wireless communication device of claim 1, wherein:

the first wireless communication device is an access point associated with a basic service set identifier, the second wireless communication device is a station, the control signaling is transmitted by the first wireless communication device, and the control signaling indicates the basic service set identifier.

9. The first wireless communication device of claim 8, wherein the processing system is further configured to cause the first wireless communication device to:

transmit, to a third wireless communication device, second control signaling that indicates that the first wireless communication device will transmit a second beamformed message to the third wireless communication device, wherein the second control signaling includes a second indication that the third wireless communication device is to apply channel smoothing filtering to the second beamformed message, and wherein the third wireless communication device is a second station; and transmit, to the third wireless communication device and in association with the second control signaling, the second beamformed message via a second set of frequency tones, wherein the second beamformed message at least partially overlaps in time with the beamformed message, wherein one or both of the second beamformed message satisfies the delay spread threshold or a second phase alignment of the second beamformed message associated with the second set of frequency tones satisfies the phase alignment threshold.

10. The first wireless communication device of claim 1, wherein, to communicate the control signaling, the processing system is configured to cause the first wireless communication device to:

transmit, to the second wireless communication device, capability signaling indicating a capability of the first wireless communication device to transmit beamformed messages, wherein the first wireless communication device is a station, and wherein the second wireless communication device is an access point; and transmit, to the second wireless communication device, a null data packet announcement frame that indicates a transmitter address corresponding to the first wireless communication device and a receiver address corresponding to the second wireless communication device for the beamformed message.

11. The first wireless communication device of claim 1, wherein the indication in the control signaling is associated with an expectation that the beamformed message will satisfy at least one of the delay spread threshold or the phase alignment threshold.

12. The first wireless communication device of claim 1, wherein the delay spread threshold is less than-X dBc power outside of a Y nanosecond time interval.

13. A method for wireless communications at a first wireless communication device, comprising:

communicating, with a second wireless communication device, control signaling that indicates that the first wireless communication device is scheduled to transmit a beamformed message to the second wireless communication device, and wherein the control signaling includes an indication that the second wireless communication device is to apply channel smoothing filtering to the beamformed message;

transmitting, to the second wireless communication device and in association with the control signaling, the beamformed message via a set of frequency tones, wherein one or both of the beamformed message satisfies a delay spread threshold or a phase alignment of the beamformed message associated with the set of frequency tones satisfies a phase alignment threshold; and applying a first v-smooth filtering process in a first tone domain to a packet mapped to the set of frequency tones; or applying the first v-smooth filtering process in the first tone domain to the packet and applying a second v-smooth filtering process to the packet in a second tone domain subsequent to applying the first v-smooth filtering process, wherein satisfaction of the delay spread threshold is based at least in part on application of at least one of the first v-smooth filtering process or the second v-smooth filtering process.

14. The method of claim 13, wherein communicating the control signaling comprises:

transmitting a control message that includes a first field that indicates that the first wireless communication device is scheduled to transmit the beamformed message, wherein the control message includes a second field that includes the indication that the second wireless communication device is to apply channel smoothing filtering to the beamformed message.

15. The method of claim 13, wherein the control signaling indicates to apply a level of channel smoothing filtering that is associated with at least one of the phase alignment threshold or the delay spread threshold.

16. The method of claim 13, wherein:

the control signaling comprises an indication of a device type of the first wireless communication device, the indication of the device type indicates that the first wireless communication device is scheduled to transmit the beamformed message, and the indication of the device type is the indication that the second wireless communication device is to apply channel smoothing filtering to the beamformed message.

17. The method of claim 13, wherein communicating the control signaling comprises:

transmitting a first control message that indicates that the first wireless communication device is scheduled to transmit the beamformed message to the second wireless communication device;

44 receiving a second control message that indicates a feedback type and receiver type of the second wireless communication device; and transmitting, in response to the second control message, a third control message that includes the indication that the second wireless communication device is to apply channel smoothing filtering to the beamformed message.

18. The method of claim 17, wherein the first control message is a first vendor specific frame, the second control message is a second vendor specific frame, and the third control message is a third vendor specific frame.

19. A non-transitory computer-readable medium storing code for wireless communications at a first wireless communication device, the code comprising instructions executable by one or more processors to:

communicate, with a second wireless communication device, control signaling that indicates that the first wireless communication device is scheduled to transmit a beamformed message to the second wireless communication device, and wherein the control signaling includes an indication that the second wireless communication device is to apply channel smoothing filtering to the beamformed message;

transmit, to the second wireless communication device and in association with the control signaling, the beamformed message via a set of frequency tones, wherein one or both of the beamformed message satisfies a delay spread threshold or a phase alignment of the beamformed message associated with the set of frequency tones satisfies a phase alignment threshold; and apply a first v-smooth filtering process in a first tone domain to a packet mapped to the set of frequency tones; or apply the first v-smooth filtering process in the first tone domain to the packet and apply a second v-smooth filtering process to the packet in a second tone domain subsequent to applying the first v-smooth filtering process, wherein satisfaction of the delay spread threshold is based at least in part on application of at least one of the first v-smooth filtering process or the second v-smooth filtering process.

* * * * *